United States Patent
Hara

(10) Patent No.: US 9,233,620 B2
(45) Date of Patent: Jan. 12, 2016

(54) INFORMATION PROVIDING DEVICE, INFORMATION PROVIDING SERVER, VEHICLE ASSISTANCE SYSTEM, NAVIGATION DEVICE, AND CHARGING CABLE

(75) Inventor: Tetsuo Hara, Kanagawa (JP)

(73) Assignee: SMK Corporation, Tokyo (JP)

( * ) Notice: Subject to any disclaimer, the term of this patent is extended or adjusted under 35 U.S.C. 154(b) by 656 days.

(21) Appl. No.: 13/281,447

(22) Filed: Oct. 26, 2011

(65) Prior Publication Data

US 2012/0109409 A1     May 3, 2012

(30) Foreign Application Priority Data

Oct. 28, 2010  (JP) .................................. 2010-242679
May 26, 2011  (JP) .................................. 2011-118506

(51) Int. Cl.
*G06F 7/00* (2006.01)
*H02J 7/00* (2006.01)
(Continued)

(52) U.S. Cl.
CPC ............... *B60L 11/1824* (2013.01); *B60L 3/12* (2013.01); *B60L 11/1818* (2013.01); *B60L 11/1844* (2013.01); *B60L 11/1846* (2013.01); *B60L 11/1861* (2013.01); *B60L 2200/26* (2013.01); *B60L 2240/12* (2013.01);
(Continued)

(58) Field of Classification Search
CPC ............ B60L 11/1824; B60L 11/1827; B60L 11/1833; B60L 11/1837; B60L 11/1842; B60L 11/1844; B60L 11/1846; B60L 11/1851; B60L 11/1861; B60L 11/1862; Y02T 90/16; Y02T 90/161; Y02T 90/162; Y02T 90/163; Y02T 90/164; Y02T 90/165; Y02T 90/166; Y02T 90/167; Y02T 90/168; Y02T 90/169; Y04S 10/126
USPC ....................................... 701/1, 408; 320/109
See application file for complete search history.

(56) References Cited

U.S. PATENT DOCUMENTS

2008/0039989 A1     2/2008  Pollack et al.
2009/0278492 A1*   11/2009  Shimizu et al. ............... 320/108

FOREIGN PATENT DOCUMENTS

JP     2000-102102 A    4/2000
JP     2004-189144 A    7/2004
(Continued)

OTHER PUBLICATIONS

Office Action for Japanese Patent Application No. 2011-118506, issued by the Japanese Patent Office on Mar. 18, 2014.
(Continued)

*Primary Examiner* — Mussa A Shaawat
*Assistant Examiner* — Kyung Kim

(57) ABSTRACT

It is an object to provide a system for assisting a vehicle on the edge of battery exhaustion. An information providing device includes: an information acquiring part for acquiring the current location of a vehicle and the amount of power stored in a power storage unit of the vehicle from a plurality of vehicles; a vehicle selecting part for selecting one or more vehicles as available vehicles for power supply from the plurality of vehicles based on the respective current locations and the amounts of stored power of the plurality of vehicles, the one or more vehicles to be selected being capable of supplying charging power to a target vehicle requiring charge of its power storage unit; and a notifying part for notifying of an available vehicle for power supply selected by the vehicle selecting part.

16 Claims, 14 Drawing Sheets

(51) Int. Cl.
*G01C 21/34* (2006.01)
*B60L 11/18* (2006.01)
*B60L 3/12* (2006.01)

(52) U.S. Cl.
CPC ..... *B60L 2240/622* (2013.01); *B60L 2240/662* (2013.01); *B60L 2240/72* (2013.01); *B60L 2240/80* (2013.01); *B60L 2250/12* (2013.01); *B60L 2250/16* (2013.01); *B60L 2260/50* (2013.01); *B60L 2260/52* (2013.01); *B60L 2260/54* (2013.01); *Y02E 60/721* (2013.01); *Y02T 10/7005* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(56) References Cited

FOREIGN PATENT DOCUMENTS

| | | |
|---|---|---|
| JP | 2005-168085 A | 6/2005 |
| JP | 2005-210843 A | 8/2005 |
| JP | 3919009 B2 | 5/2007 |
| JP | 2007-252118 A | 9/2007 |
| JP | 2007-267561 A | 10/2007 |
| JP | 2008-77267 A | 4/2008 |
| JP | 2010-79456 A | 4/2010 |
| JP | 2010-110050 A | 5/2010 |

OTHER PUBLICATIONS

Partial European Search Report for European Patent Application No. 11186737.0, issued by the European Patent Office on Oct. 29, 2014.

* cited by examiner

| VEHICLE TYPE ID | SECTION ID | SEASON | WEATHER | TIME FRAME | POWER CONSUMPTION RATE |
|---|---|---|---|---|---|
| #ABC ··· | #abc ··· | SPRING, SUMMER, AND OTHERS | FAIR WEATHER, TEMPERATURE AT XX DEGREES, AND OTHERS | MORNING HOURS/DAYTIME HOURS | ×○ km/kWh |
| ⋮ | ⋮ | ⋮ | ⋮ | ⋮ | ⋮ |

| VEHICLE ID TO RECEIVE POWER | VEHICLE ID TO SUPPLY POWER | AMOUNT OF CHARGING POWER |
|---|---|---|
| #10a | #10b | ○○kWh |
| ⋮ | ⋮ | ⋮ |

150

INFORMATION PROVIDING DEVICE, INFORMATION PROVIDING SERVER, VEHICLE ASSISTANCE SYSTEM, NAVIGATION DEVICE, AND CHARGING CABLE

CROSS REFERENCE TO RELATED APPLICATION

The contents of the following Japanese patent application are incorporated herein by reference:

Japanese Patent Application No. 2011-118506 filed on May 26, 2011.

BACKGROUND

1. Technical Field

The present invention relates to an information providing device, information providing server, vehicle assistance system, a navigation device, and a charging cable.

2. Related Art

Techniques disclosed in Japanese Patent Application Publication No. 2000-102102, Japanese Patent Application Publication No. 2007-267561, Japanese Patent Application Publication No. 2010-110050, Japanese Patent No. 3919009, Japanese Patent Application Publication No. 2010-79456, Japanese Patent Application Publication No. 2008-77267 and Japanese Patent Application Publication No. 2007-252118 are known as techniques for feeding power to electric-powered motor vehicles. Information display devices for vehicles for calculating the fuel efficiencies of the vehicles and displaying the calculated fuel efficiencies are also known (as disclosed in Japanese Patent Application Publication No. 2004-189144).

A shortage of the remaining capacity in a battery installed on a vehicle and absence of a charging station nearby necessitates an action such as call for an emergency vehicle. This results in great inconvenience as the battery cannot be charged timely.

SUMMARY

In order to solve the aforementioned problems, a first aspect of the invention is an information providing device including: an information acquiring part for acquiring the current location of a vehicle and the amount of power stored in a power storage unit of the vehicle from a plurality of vehicles; a vehicle selecting part for selecting one or more vehicles as available vehicles for power supply from the plurality of vehicles based on the respective current locations and the amounts of stored power of the plurality of vehicles, the one or more vehicles to be selected being capable of supplying charging power to a target vehicle requiring charge of its power storage unit; and a notifying part for notifying of an available vehicle for power supply selected by the vehicle selecting part.

The information acquiring part may further acquire the respective destinations of the plurality of vehicles. The information providing device may further include a power amount specifying part for specifying the amount of available power to be supplied to a different vehicle based on the respective destinations, the current locations, and the amounts of stored power of the plurality of vehicles. The vehicle selecting part may select a vehicle from the plurality of vehicles as an available vehicle for power supply having available power to be supplied in an amount greater than the amount of power to be charged to the power storage unit of the target vehicle requiring charge.

The vehicle selecting part may select a vehicle as an available vehicle for power supply from vehicles each having available power to be supplied in an amount greater than the amount of charging power based on the current location and the destination of the target vehicle, and the respective current locations and the destinations of the plurality of vehicles. The vehicle to be selected as an available vehicle for power supply is to pass through a point within a predetermined distance determined from the future location of the target vehicle.

The information providing device may further include a route specifying part for specifying respective future routes for the plurality of vehicles based on the respective current locations and the destinations of the plurality of vehicles. The vehicle selecting part may select a vehicle as an available vehicle for power supply from vehicles each having available power to be supplied in an amount greater than the amount of charging power based on the respective current locations of the plurality of vehicles and the routes specified by the route specifying part, the current location of the target vehicle, and a route for and a previously calculated vehicle speed for the target vehicle. The vehicle to be selected as an available vehicle for power supply is to pass through a point simultaneously with the target vehicle that is within a predetermined distance determined from the future location of the target vehicle.

The notifying part may notify of a point the available vehicle for power supply and the target vehicle are to pass through simultaneously after making determination as to if the specified routes are along expressways or open roads.

The information providing device may further include a power consumption rate storage part for storing a reference value of a power consumption rate in association with a route. The power amount specifying part may specify the amount of available power to be supplied based on the reference value of a power consumption rate stored in the power consumption rate storage part and the routes specified by the route specifying part.

The power amount specifying part may specify the respective power consumption efficiencies of the plurality of vehicles based on a history of the current locations and remaining capacities acquired by the information acquiring part, and may specify the amount of available power to be supplied based on the specified power consumption efficiencies and the routes specified by the route specifying part.

The information acquiring part may acquire selection information indicating a vehicle selected by the target vehicle as a vehicle to supply charging power to the target vehicle from the available vehicles for power supply notified by the notifying part. The notifying part may transmit a selection notification to the vehicle indicated by the selection information, the selection notification notifying the vehicle of the fact that the vehicle has been selected by the target vehicle.

The notifying part may transmit the selection notification to the vehicle indicated by the selection information, the selection notification indicating a request for supply of charging power. The information acquiring part may receive consent information indicating consent of supply of charging power from the vehicle having received the selection notification from the notifying part. The information providing device may further include an information storage part for storing information about charge between vehicles that stores information for identifying a vehicle to supply power having transmitted the consent information, and information for identifying the target vehicle in association with each other.

The notifying part may notify the vehicle identified by one of the identification information of at least one of the vehicle type, the body color, and the license plate number of the vehicle identified by the other one of the identification information, the identification information being stored in association with each other in the information storage part for storing information about charge between vehicles.

The information providing device may further include an authenticating part for communicating with a charging cable connected to a first vehicle and a second vehicle, and transmitting information indicating whether charge between the first and second vehicles is allowed or not to the charging cable. The authenticating part may transmit information indicating permission for charge between the first vehicle and the second vehicle to the charging cable when the information storage part for storing information about charge between vehicles stores information for identifying the first vehicle and information for identifying the second vehicle in association with each other.

A second aspect of the invention is a navigation device for use in a vehicle, including: an information acquiring part for acquiring the current location and the destination of a vehicle; a power amount specifying part for calculating the amount of power capable of being supplied to a different vehicle based on the current location and the destination of the vehicle, and the amount of power stored in a power storage unit of the vehicle; a communication part for transmitting the current location and the amount of power calculated by the power amount specifying part to an external information providing device; a different-vehicle information acquiring part for acquiring, from the information providing device, information about a different vehicle that is to be charged with power of the power storage unit; and a presenting part for presenting the information about the different vehicle.

A third aspect of the invention is a charging cable used for charging a power storage unit of a vehicle, the charging cable including: first and second end connections connected to respective different vehicles; an identification information acquiring part for acquiring first identification information and second identification information from first and second vehicles connected to the first and second end connections, respectively, the first and second identification information identifying the first and second vehicles, respectively; an authenticating part for communicating with an information providing device that stores, in association with identification information identifying a vehicle having a power storage unit requiring charge, identification information for identifying the vehicle to supply charging power to the power storage unit, and determining if the information providing device stores the second identification information in association with the first identification information; and a charge control part for charging a power storage unit of the first vehicle with power from a power storage unit of the second vehicle through the first and second end connections if the authenticating part determines that the information providing device stores the second identification information in association with the first identification information.

The summary of the invention described above does not include all the requisite features of the present invention. Further, a sub-combination of the features in a group may also form the invention.

BRIEF DESCRIPTION OF THE DRAWINGS

FIG. 5 shows a diagram showing one example of data in a table format about power consumption efficiency;

DESCRIPTION OF EXEMPLARY EMBODIMENTS

The present invention will be described with reference to an embodiment of the invention given below. However, the embodiment described below is not intended to limit the scope of the invention recited in appended claims. Further, not all combinations of features described in the embodiment are indispensable to the solving means of the present invention.

Figure 1:
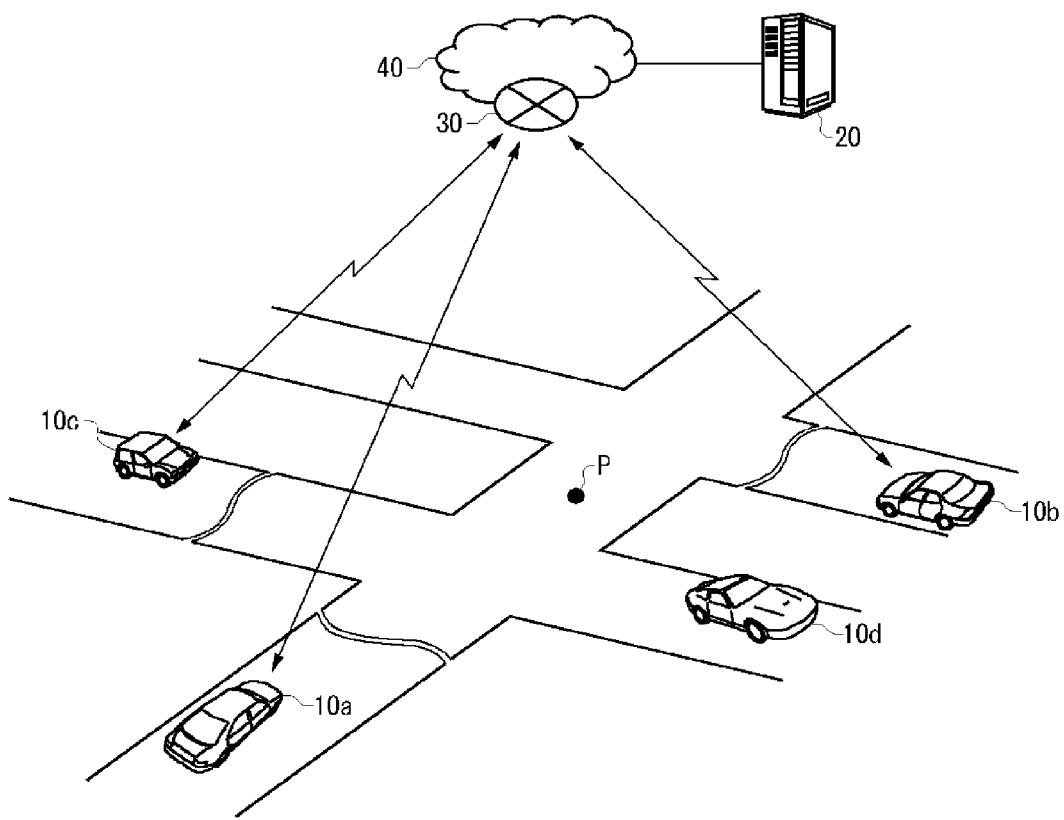
FIG. 1 shows a diagram showing the overall structure of a vehicle assistance system 50 according to an embodiment.

FIG. 1 shows the overall structure of a vehicle assistance system 50 according to the embodiment. The vehicle assistance system 50 provides an assistance system for a plurality of vehicles, and specifically, provides a system for assisting in the charge of the vehicles. The vehicle assistance system 50 includes a plurality of vehicles 10a to 10d, a vehicle assistance server 20, a mobile communications network 30, and a network 40. The mobile communications network 30 may be a communications network such as a mobile telephone network that allows data communications and conversation. The network 40 may be a computer network such as the Internet.

The vehicles 10a to 10d may collectively be called a vehicle 10 in the description of the vehicle assistance system 50. While only the four vehicles 10a to 10d are shown due to limitations of space, any number of vehicles may be contained in the vehicle assistance system 50.

A vehicle 10 is assumed to be a vehicle with a battery capable of being charged and discharged. The vehicle 10 is driven by using power from the battery installed on the vehicle 10. As an example, a motor and the like of the vehicle 10 is driven by using power from its battery, thereby causing the vehicle 10 to travel. The function and the operation of the vehicle assistance system 50 of the embodiment will be described based on the assumption that electric energy stored in the battery is mainly used for travel of the vehicle 10. Meanwhile, the electric energy stored in the battery of the vehicle 10 may also be used to drive other electric units installed on the vehicle 10 including an air-conditioning unit, an illuminating unit such as a light, and a navigation device.

A vehicle 10 communicates with the vehicle assistance server 20 as an example of an information providing device through the mobile communications network 30 and the network 40. The vehicle 10 acquires vehicle status data at regular intervals such as the remaining capacity stored in the battery, a current location and a destination, and transmits the acquired data through the mobile communications network 30 to the vehicle assistance server 20. The vehicle assistance server 20 specifies a vehicle 10 requiring charge of a battery based on the vehicle status data received from the respective vehicles 10. The vehicle 10 requiring charge of a battery may also be called a target vehicle. By way of example, the vehicle assistance server 20 specifies a vehicle as a target vehicle if the remaining capacity stored in the battery received from this vehicle cannot allow the vehicle to travel to a nearest charging station. Here, the vehicle 10a is specified as a target vehicle.

After specifying a target vehicle, the vehicle assistance server 20 specifies a vehicle 10 having a surplus of remaining capacity and which can supply charging power to the battery of the vehicle 10a. A vehicle capable of supplying charging power is called as an available vehicle for power supply. As an example, based on vehicle status data about a vehicle 10, the vehicle assistance server 20 specifics a vehicle 10 as an available vehicle for power supply having a surplus of remaining capacity and which can be in an area within a radius of five kilometers of the vehicle 10a in the future. Here, the vehicle assistance server 20 specifics the vehicles 10b and 10c as available vehicles for power supply to the vehicle 10a that are to reach a place near a future location P of the vehicle 10a simultaneously with the vehicle 10a, for example. The vehicle assistance server 20 may not specify, as an available vehicle for power supply, the vehicle 10d that is to go away from the future location P.

If the vehicles 10b and 10c are specified as available vehicles for power supply, the vehicle assistance server 20 transmits information about the vehicles 10b and 10c such as the current locations thereof to the vehicle 10a. The vehicle assistance server 20 may also transmit information about the vehicle 10a such as the current location thereof to the vehicles 10b and 10c. Then, the vehicle assistance server 20 acts as an intermediary in the communication between a passenger of the vehicle 10a and a passenger of the vehicle 10b, or between a passenger of the vehicle 10a and a passenger of the vehicle 10c. Thus, the vehicle assistance server 20 assists in establishment of a relationship between supply and demand of power without requiring direct exchange of personal information. After establishing the relationship between supply and demand, the vehicle assistance server 20 assists in smooth meeting by suggesting a possible meeting point, or by making vehicles exchange their information such as vehicle types.

After a battery of one vehicle is charged from a battery from a different vehicle, the vehicle assistance server 20 proceeds to accounting in response to the amount of power charged. As an example, the vehicle assistance server 20 takes steps for settlement with a credit card registered by a user of the vehicle 10a. Further, the vehicle assistance server 20 gives an incentive responsive to the amount of power charged to a user of a vehicle 10 having provided power. As an example, the vehicle assistance server 20 asks a bank that manages an account registered by the user of this vehicle 10 to make payment responsive to the amount of power charged, or gives a reward responsive to the amount of power charged to the user of the aforementioned vehicle 10.

The vehicle assistance system 50 described above can inform a vehicle 10 on the edge of battery exhaustion of a different nearby vehicle 10 having sufficient remaining capacity whenever necessary. Accordingly, the vehicle 10 on the edge of battery exhaustion can smoothly be charged after meeting the nearby vehicle 10 having sufficient remaining capacity. A person can provide power without any worry as a commensurate incentive is given to a person having provided power. Accordingly, things go quite smoothly compared to the case where a vehicle expected to provide power should be summoned by beckoning to such a vehicle, for example. Also, a necessity to call for an emergency vehicle and the like is significantly reduced. Thus, a user of a vehicle 10 can easily go on a drive without concern for the remaining capacity of a battery.

Figure 2:
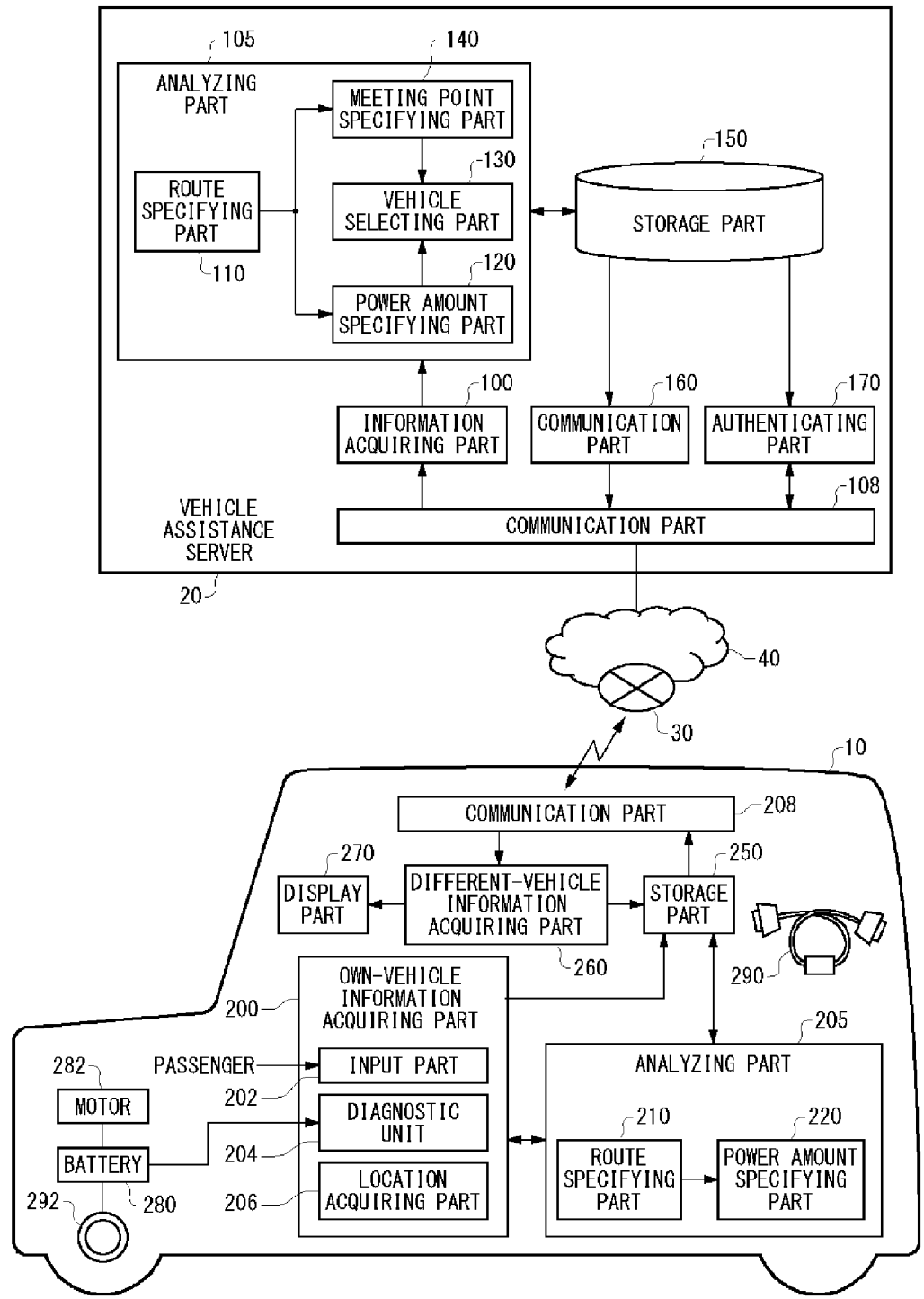
FIG. 2 shows a diagram showing one example of a block structure of a vehicle assistance system 50.

FIG. 2 shows one example of a block structure of a vehicle 10 and the vehicle assistance server 20 together with the networks and a charging cable 290. The vehicle assistance server 20 includes a communication part 108, an information acquiring part 100, an analyzing part 105, a storage part 150, a notifying part 160, and an authenticating part 170. The vehicle 10 includes a communication part 208, an own-vehicle information acquiring part 200, an analyzing part 205, a storage part 250, a different-vehicle information acquiring part 260, a display part 270, a battery 280, a motor 282, and a cable connecting part 292. In one embodiment, the functional blocks of the communication part 208, the own-vehicle information acquiring part 200, the analyzing part 205, the storage part 250, the different-vehicle information acquiring part 260, and the display part 270 may be implemented in a vehicle-mounted navigation device, or may be included in a smartphone or a personal digital assistant (PDA). In either case, the functional block of a diagnostic unit 204 may be provided by an external diagnostic unit.

The charging cable 290 can be stored, for example, inside a trunk of a vehicle 10, and carried together with the vehicle 10. The charging cable 290 is lent to or provided to a user of a vehicle 10 if the user subscribes to a vehicle assistance service provided by the vehicle assistance server 20. The battery 280 is an example of a power storage unit. Electric energy stored in the battery 280 is supplied to the motor 282. The motor 282 is driven by the received electric energy to cause the vehicle 10 to travel. Various rechargeable batteries may be employed as the battery 280 including a lithium-ion battery, a nickel-hydrogen battery, a lead storage battery, and a lithium-air battery. The power storage unit of a vehicle 10 is not limited to these rechargeable batteries. The power storage unit may also be any power supply units capable of being charged and discharged including a capacitor or a flywheel, or a combination of the rechargeable batteries and the capacitor or the flywheel. A description will be given of the function and the operation of the vehicle assistance system 50 of the embodiment based on the assumption that the battery 280 is used as an example of a power storage unit, and the remaining capacity of the battery 280 is used as an example of the amount of power stored in the power storage unit.

The own-vehicle information acquiring part 200 of a vehicle 10 acquires vehicle status data about the vehicle 10 itself. The own-vehicle information acquiring part 200 includes an input part 202, the diagnostic unit 204, and a location acquiring part 206. The location acquiring part 206 acquires the current location of the vehicle 10. The location acquiring part 206 may calculate the current location by receiving a radio signal from a GPS satellite, or by acquiring information about a base station provided by the mobile communications network 30. The location acquiring part 206 may also calculate an azimuth by detecting the Earth's magnetism. The input part 202 acquires various indicators such as a destination and a relay point of a route based on an operation by a passenger of the vehicle 10. The passenger may include a driver and a fellow passenger of the vehicle 10. The input part 202 may be a manipulated input device or an audio input device of a touch panel unit of a vehicle-mounted navigation device, for example. The diagnostic unit 204 is connected to an on-board diagnosis system (OBD system) through an OBD connector, and which can acquire diagnostic data, for example, from an ECU. The diagnostic unit 204 may alternatively acquire diagnostic data through a controller area network (CAN). Examples of the diagnostic data include the remaining capacity of the battery 280, a travel distance, a vehicle type information, and a vehicle identification number. History information such as a history of a degree of pressing of a gas pedal, a history of use of an air-conditioning unit, and a history of use of a light may be acquired as data to affect the remaining capacity of the battery 280. As described above, the own-vehicle information acquiring part 200 acquires the current location and the destination of the vehicle 10, a relay point, the remaining capacity of the battery 280, a travel distance, vehicle type information, a vehicle identification number, and various pieces of history information as own-vehicle status data.

The analyzing part 205 analyzes the own-vehicle status data acquired by the own-vehicle information acquiring part 200. The analyzing part 205 includes a route specifying part 210 and a power amount specifying part 220. The power amount specifying part 220 calculates the amount of available power to be supplied to a different vehicle 10 based on a destination, a current location, and the remaining capacity of the battery 280. The power amount specifying part 220 may also calculate the amount of power shortage based on a destination, a current location, and the remaining capacity of the battery 280. More specifically, the route specifying part 210 specifies a route based on a current location, a destination, and a relay point acquired by the own-vehicle information acquiring part 200. Then, the power amount specifying part 220 calculates the amount of available power to be supplied or the amount of power shortage based on the route specified by the route specifying part 210 and the power consumption rate of a vehicle 10. The power amount specifying part 220 can calculate the power consumption rate of the vehicle 10 based on a history of a travel distance and a history of the remaining capacity of the battery 280. The power amount specifying part 220 may further refer to history information such as a history of a degree of pressing of a gas pedal, a history of use of an air-conditioning unit, and a history of use of a light to calculate the amount of available power to be supplied or the amount of power shortage.

The storage part 250 stores own-vehicle status data acquired by the own-vehicle information acquiring part 200, and a result of analysis made by the analyzing part 205. As an example, the storage part 250 stores information including vehicle type information and a vehicle identification number about a vehicle 10, the current location and the destination of the vehicle 10, a relay point, the remaining capacity of the battery 280, and the travel distance, route, power consumption rate, and the amount of available power to be supplied or the amount of power shortage of the vehicle 10. The communication part 208 transmits and receives data to and from the vehicle assistance server 20. More specifically, the communication part 208 transmits the information stored in the storage part 250 to the vehicle assistance server 20 through the mobile communications network 30. As described, the communication part 208 can transmit a current location, and the amount of available power to be supplied or the amount of power shortage calculated by the power amount specifying part 220 to the external vehicle assistance server 20.

The communication part 208 supplies data about an available vehicle for power supply received from the vehicle assistance server 20 to the different-vehicle information acquiring part 260. The different-vehicle information acquiring part 260 extracts information about an available vehicle for power supply or information about a target vehicle from the data supplied from the communication part 208.

If the vehicle 10a is assumed to be a target vehicle, the different-vehicle information acquiring part 260 extracts information about the vehicles 10b and 10c as available vehicles for power supply. More specifically, the different-vehicle information acquiring part 260 acquires, from the vehicle assistance server 20, information about the different vehicles 10b and 10c that can supply charging power to the battery 280. If the vehicle 10b or 10c is assumed to be an available vehicle for power supply, the different-vehicle information acquiring part 260 extracts information about the vehicle 10a as a target vehicle. More specifically, the different-vehicle information acquiring part 260 acquires, from the vehicle assistance server 20, information about the different vehicle 10a to be charged with the power of the battery 280.

Examples of information about a different vehicle 10 include the vehicle type and the body color of the different vehicle 10, the current location of the different vehicle 10, and the remaining capacity of the battery 280. To be specific, the different-vehicle information acquiring part 260 acquires at least one of the vehicle type, the body color, and the license plate number of the different vehicle 10 from the information providing device. Then, the display part 270 presents the information acquired by the different-vehicle information acquiring part 260 to a passenger of a vehicle 10. More specifically, the display part 270 displays the information acquired by the different-vehicle information acquiring part 260 on a display device, thereby presenting the information to the passenger of the vehicle 10. The display part 270 may be a display device of a vehicle-mounted navigation device, on which navigation information such as map information can be displayed as well as the information about the different vehicle 10.

The communication part 108 of the vehicle assistance server 20 transmits and receives data to and from the communication part 208 of a vehicle 10 through the mobile communications network 30 and the network 40. The communication part 108 receives status data from the communication part 208 of each of the plurality of vehicles 10 through the mobile communications network 30 and the network 40. Examples of the status data received by the communication part 108 include the vehicle type information and the vehicle identification number of a vehicle 10, the current location and the destination of the vehicle 10, a relay point, the remaining capacity of the battery 280, and the travel distance, route, power consumption rate, and the amount of available power to be supplied or the amount of power shortage of the vehicle 10. The data acquired by the communication part 108 including the current location and the destination of the vehicle 10, a relay point, the remaining capacity of the battery 280, and the travel distance, route, power consumption rate, and the amount of available power to be supplied or the amount of power shortage of the vehicle 10 is supplied to the information acquiring part 100. This allows the information acquiring part 100 to acquire the current location and the destination of a vehicle 10, and the remaining capacity of the battery 280 of the vehicle 10 from each of the plurality of vehicles 10.

The analyzing part 105 analyzes vehicle status data about each of the vehicles 10 acquired by the information acquiring part 100. The analyzing part 105 includes a power amount specifying part 120, a vehicle selecting part 130, and a meeting point specifying part 140.

The power amount specifying part 120 specifies the amount of available power to be supplied to a different vehicle based on the respective destinations, respective current locations, and respective remaining capacities of the plurality of vehicles 10. The power amount specifying part 120 also specifies the amount of power shortage based on the respective destinations, respective current locations, and respective remaining capacities of the plurality of vehicles 10. More specifically, the root specifying part 110 specifies respective future routes for the plurality of vehicles 10 based on the respective current locations and the destinations of the vehicles 10. Like the route specifying part 210, the route specifying part 110 may further refer to a relay point to specify a future route. Vehicle status data may contain a future route. In this case, the route specifying part 110 may specify such a future route contained in this vehicle status data as a future route of a vehicle 10 concerned. The power amount specifying part 120 calculates the amount of available power to be supplied or the amount of power shortage based on the future route specified by the route specifying part 110 and a power consumption rate.

As an example, the storage part 150 stores a reference value of a power consumption rate for each vehicle type in association with a route, and the power amount specifying part 120 specifies the amount of available power to be supplied or the amount of power shortage based on the reference value of a power consumption rate stored in the storage part 150 and a route specified by the route specifying part 110. The storage part 150 can function as a power consumption rate storage part to store a reference value of a power consumption rate. The power amount specifying part 120 may refer to the actual power consumption rate of each vehicle 10 in addition to the reference value of a power consumption rate, or may alternatively refer to the actual power consumption rate of each vehicle 10 instead of the reference value of a power consumption rate to specify the amount of available power to be supplied or the amount of power shortage. As an example, the power amount specifying part 120 may calculate the actual power consumption rate of each vehicle 10 based on a history of a travel distance and a history of remaining capacity contained in vehicle status data. As described above, the power amount specifying part 120 may specify the power consumption efficiency of each of the plurality of vehicles 10 based on a history of a current location and a history of remaining capacity acquired by the information acquiring part 100, and specify the amount of available power to be supplied based on the specified power consumption efficiency and a route specified by the route specifying part 110. If vehicle status data contains a power consumption rate, the power amount specifying part 120 may specify such a power consumption rate contained in this vehicle status data as the power consumption rate of a vehicle 10 concerned.

If vehicle status data acquired by the information acquiring part 100 from a vehicle 10 contains the amount of available power to be supplied, the power amount specifying part 120 may specify such an amount of available power to be supplied in this vehicle status data as the amount of available power to be supplied of the vehicle 10 concerned. Or, if vehicle status data acquired by the information acquiring part 100 from a vehicle 10 contains the amount of power shortage, the power amount specifying part 120 may specify such an amount of power shortage in this vehicle status data as the amount of power shortage of the vehicle 10 concerned.

The vehicle selecting part 130 selects a vehicle 10 from the plurality of vehicles 10 as an available vehicle for power supply having available power to be supplied in an amount greater than the amount of power to be charged to the battery 280 of a target vehicle. More specifically, based on the current location and the destination of the target vehicle, and the respective current locations and the destinations of the plurality of vehicles 10, the vehicle selecting part 130 selects a vehicle 10 as an available vehicle for power supply from vehicles 10 each having available power to be supplied in an amount greater than the amount of charging power. The vehicle 10 to be selected here is to pass through a point within a predetermined distance determined from the future location of the target vehicle.

As an example, based on the respective current locations of the plurality of vehicles 10 and routes for the vehicles 10 specified by the route specifying part 110, the current location of a target vehicle, and a route for and a previously calculated vehicle speed for the target vehicle, the meeting point specifying part 140 specifies a vehicle 10 to pass through a point simultaneously with the target vehicle that is within a predetermined distance determined from the future location of the target vehicle. If there is a vehicle 10 to pass through the point simultaneously with the target vehicle, the meeting point specifying part 140 specifies an area within the predetermined distance from the future location as a meeting area in which the target vehicle and an available vehicle for power supply can meet in the future. The previously calculated vehicle speed may be a reference value of a vehicle speed determined in advance for each route. The reference value of a vehicle speed may be stored in advance in the storage part 150 in association with a time frame. The previously calculated vehicle speed may be a current average speed of a vehicle in each route, or may be an average speed of a vehicle in each route determined based, for example, on a forecast about a future traffic jam.

The vehicle selecting part 130 selects a vehicle 10 as an available vehicle for power supply from vehicles 10 each having available power to be supplied in an amount greater than the amount of charging power. The vehicle 10 selected here is a vehicle expected to pass through a meeting area simultaneously with a target vehicle that is specified by the meeting point specifying part 140. As described, based on the respective current locations of the plurality of vehicles 10 and routes for the vehicles 10 specified by the route specifying part 110, the current location of and a route for a target vehicle, and a previously calculated vehicle speed for the target vehicle, the vehicle selecting part 130 can select a vehicle 10 as an available vehicle for power supply from vehicles 10 each having available power to be supplied in an amount greater than the amount of charging power. The vehicle 10 selected here is a vehicle to pass through a point simultaneously with the target vehicle that is within a predetermined distance determined from the future location of the target vehicle. Thus, based on the respective current locations and the remaining capacities of the plurality of vehicles 10, the vehicle selecting part 130 can select one or more vehicles 10 as available vehicles for power supply capable of supplying charging power to a target vehicle from the plurality of vehicles 10.

The storage part 150 stores an available vehicle for power supply selected by the analyzing part 105, a target vehicle, the amount of power shortage, the amount of available power to be supplied, a meeting area, remaining capacity, and the respective current locations of the plurality of vehicles 10.

The notifying part 160 notifies an available vehicle for power supply selected by the vehicle selecting part 130. More specifically, the notifying part 160 transmits information about the available vehicle for power supply selected by the vehicle selecting part 130 to a target vehicle through the communication part 108, thereby notifying a passenger of the target vehicle of the information. The notifying part 160 may also notify the available vehicle for power supply selected by the vehicle selecting part 130 of information about the target vehicle. More specifically, the notifying part 160 may transmit information about the target vehicle to the available vehicle for power supply through the communication part 108, thereby notifying a passenger of the available vehicle for power supply of the information.

The notifying part 160 may notify at least either a target vehicle or an available vehicle for power supply of information indicating a meeting area. More specifically, the notifying part 160 may transmit information about a meeting area through the communication part 108 to at least either the available vehicle for power supply or the target vehicle, thereby notifying a passenger of the corresponding vehicle of the information. Thus, the notifying part 160 can make a notification of a point where the available vehicle for power supply and the target vehicle pass through simultaneously.

The vehicle assistance server 20 allows a passenger of a vehicle 10 to know a place in advance where the vehicle 10 can meet an available vehicle for power supply or a target vehicle. This makes it possible for a passenger of a vehicle 10 to select a vehicle to meet the vehicle 10 in a desirable area.

The vehicle assistance server 20 provides information to be used for a passenger of a target vehicle and a passenger of an available vehicle for power supply to select a vehicle to meet, or to realize smooth meeting. Provision of such information will be described later. For charge to and from a target vehicle and an available vehicle for power supply meeting each other, the charging cable 290 of the target vehicle or the available vehicle for power supply is used to connect their cable connecting parts 292, thereby charging the battery 280 of the target vehicle with the battery 280 of the available vehicle for power supply. In this case, the authenticating part 170 of the vehicle assistance server 20 communicates with the charging cable 290 to authenticate both of these vehicles 10 to determine if these vehicles 10 are correctly associated in advance in terms of a relationship between supply and demand. This authenticating process will be described later.

Figure 3:
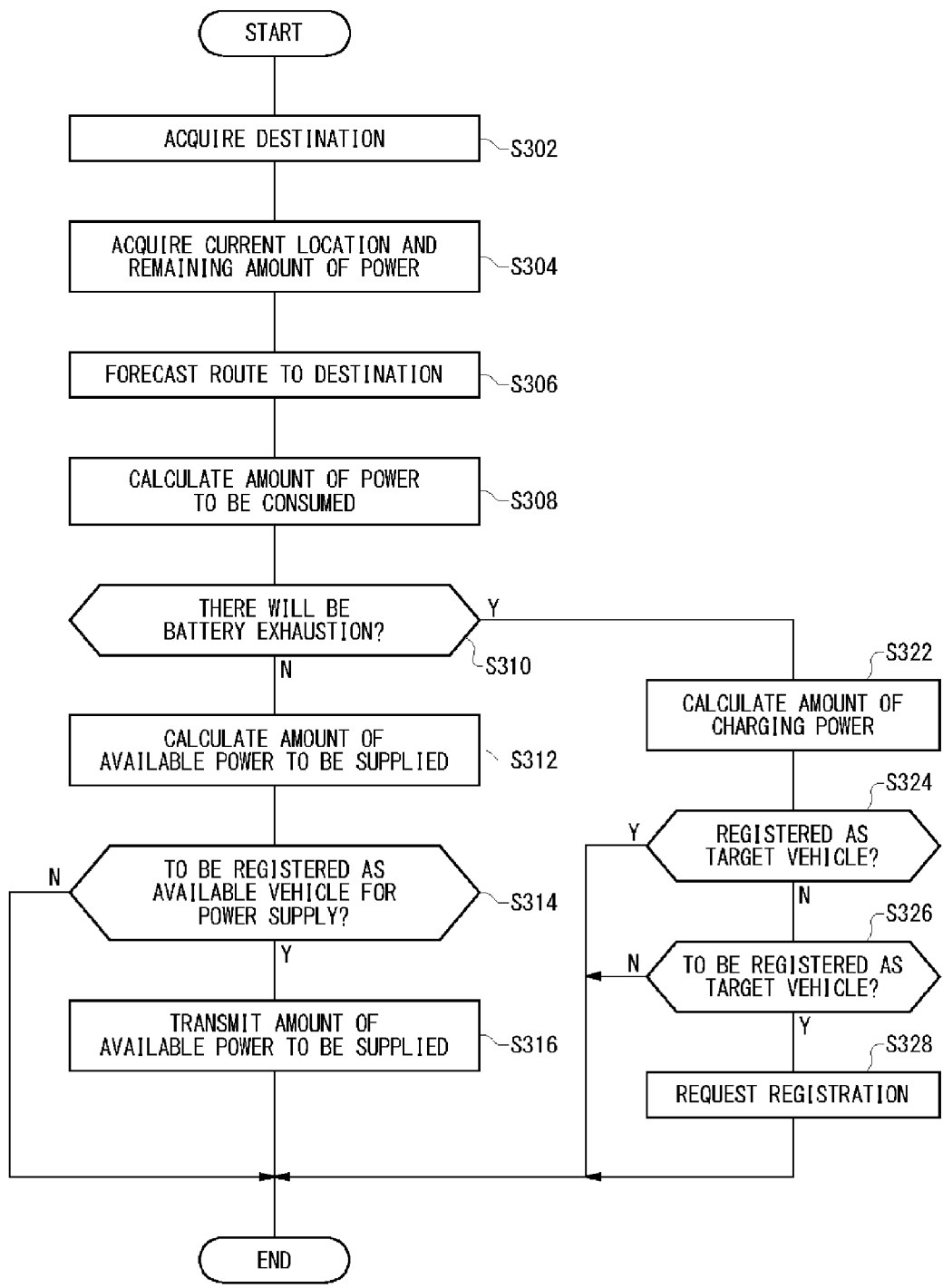
FIG. 3 shows a diagram showing one example of a process performed by the vehicle 10.

FIG. 3 is one example of a process performed by a vehicle 10. The input part 202 acquires a destination from a passenger of the vehicle 10 in step S302. As an example, the input part 202 can acquire a destination at any time before or after departure. After acquisition of the destination, the location acquiring part 206 and the diagnostic unit 204 acquires a current location and remaining capacity, respectively (step S304). The route specifying part 210 specifies a route to the destination in step S306. The route specifying part 210 may specify a route from the current location to home while passing through the destination.

In step S308, the power amount specifying part 220 calculates the amount of power to be consumed if the vehicle 10 travels from the current location to the destination along the route. The power amount specifying part 220 may calculate the amount of power to be consumed if the vehicle 10 travels along the route from the current location to the destination, and from the destination to home. Or, the power amount specifying part 220 may calculate the amount of power to be consumed if the vehicle 10 travels to a point of a nearest charging station that is on the route from the current location to home while passing through the destination. Selection of which of these amounts of power to be consumed is to be calculated is made in advance, for example, by a passenger of the vehicle 10.

The power amount specifying part 220 determines if there will be battery exhaustion on the way (step S310). More specifically, the power amount specifying part 220 calculates a value by subtracting the amount of power to be consumed from the current remaining capacity to define the calculated value as a surplus amount of power, and determines if this surplus amount of power is smaller than a predetermined value. The power amount specifying part 220 determines that there will be battery exhaustion if the surplus amount of power is smaller than the predetermined value. This predetermined value may be a value with a positive sign used as a predetermined margin.

If determining that there will be battery exhaustion in step S310, the power amount specifying part 220 calculates the amount of charging power (step S322). As an example, the power amount specifying part 220 may calculate a value by subtracting the current remaining capacity from a value obtained by adding the amount of power to be consumed calculated in step S308 and the margin to define the calculated value as the amount of charging power. It is determined in step S324 if the vehicle 10 has already been registered as a target vehicle with the vehicle assistance server 20. The process is completed if the vehicle 10 has already been registered as a target vehicle (if a result of step S324 is YES). If the vehicle 10 itself has not been registered as a target vehicle with the vehicle assistance server 20 (if a result of step S324 is NO), it is determined if the vehicle 10 is to be registered as a target vehicle with the vehicle assistance server 20 (step S326). As an example, the display part 270 displays a message about an inquiry as to the determination, and receives an entry from a passenger indicating if the vehicle 10 is to be registered as a target vehicle.

The process is completed if the vehicle 10 is not to be registered as a target vehicle (if a result of step S326 is NO). If the vehicle 10 is to be registered as a target vehicle (if a result of step S326 is YES), the communication part 208 transmits data to the vehicle assistance server 20 announcing that the vehicle 10 is to be registered as a target vehicle (step S326). In this case, the communication part 208 transmits the amount of charging power calculated in S322 as the amount of power shortage to the vehicle assistance server 20. The storage part 250 stores the status of registration with the vehicle assistance server 20 as well as the amount of charging power.

If determining that that there will be no battery exhaustion in step S310, the power amount specifying part 220 calculates the amount of available power to be supplied (step S312). As an example, the power amount specifying part 220 may calculate a value by subtracting a value obtained by adding the amount of power to be consumed calculated in step S308 and the margin from the current remaining capacity to define the calculated value as the amount of available power to be supplied.

It is determined if the vehicle 10 is to be registered as an available vehicle for power supply with the vehicle assistance server 20 (step S314). As an example, the display part 270 displays a message about an inquiry as to the determination, and receives an entry from a passenger indicating if the vehicle 10 is to be registered as an available vehicle for power supply. The process is completed if the vehicle 10 is not to be registered as an available vehicle for power supply (if a result of step S314 is NO). If the vehicle 10 is to be registered as an available vehicle for power supply (if a result of step S314 is YES), the communication part 208 transmits data to the vehicle assistance server 20 announcing that the vehicle 10 is to be registered as an available vehicle for power supply (step S316). In this case, the communication part 208 transmits the amount of available power to be supplied calculated in S312 to the vehicle assistance server 20. The storage part 250 stores the status of registration with the vehicle assistance server 20 as well as the amount of available power to be supplied.

The vehicle 10 can perform the aforementioned process each time a destination is changed. In response to change of a relay point, the vehicle 10 can also perform a process by following the aforementioned process to calculate the amount of power to be consumed on the route passing through the relay point as described above. If there is no change of a destination and a relay point, the vehicle 10 may also perform the process in step S304 and its following steps while acquiring a current location and remaining capacity at regular intervals in step S304. The vehicle 10 can register the amount of charging power or the amount of available power to be supplied again with the vehicle assistance server 20 if either amount is different from a previously registered amount.

In this example, the vehicle 10 calculates the amount of power shortage and the amount of available power to be supplied, and registers the calculated amounts with the vehicle assistance server 20. However, the vehicle 10 may transmit a current location, a relay point, a destination, and remaining capacity at regular intervals to the vehicle assistance server 20 instead of the amount of power shortage and the amount of available power to be supplied. As described above, based on such vehicle status data, the vehicle assistance server 20 can perform the same process as that shown in the aforementioned example to determine if the vehicle 10 is a target vehicle or an available vehicle for power supply, and to calculate the amount of power shortage or the amount of available power to be supplied. A burden of calculation on the vehicle 10 is reduced if the vehicle assistance server 20 performs the aforementioned process. In addition, the vehicle assistance server 20 can obtain the latest data about road conditions, location of a charging station and the like more easily than the vehicle 10. Accordingly, in some cases, the vehicle assistance server 20 can calculate the correct amount of power shortage and the correct amount of available power to be supplied.

Figure 4:
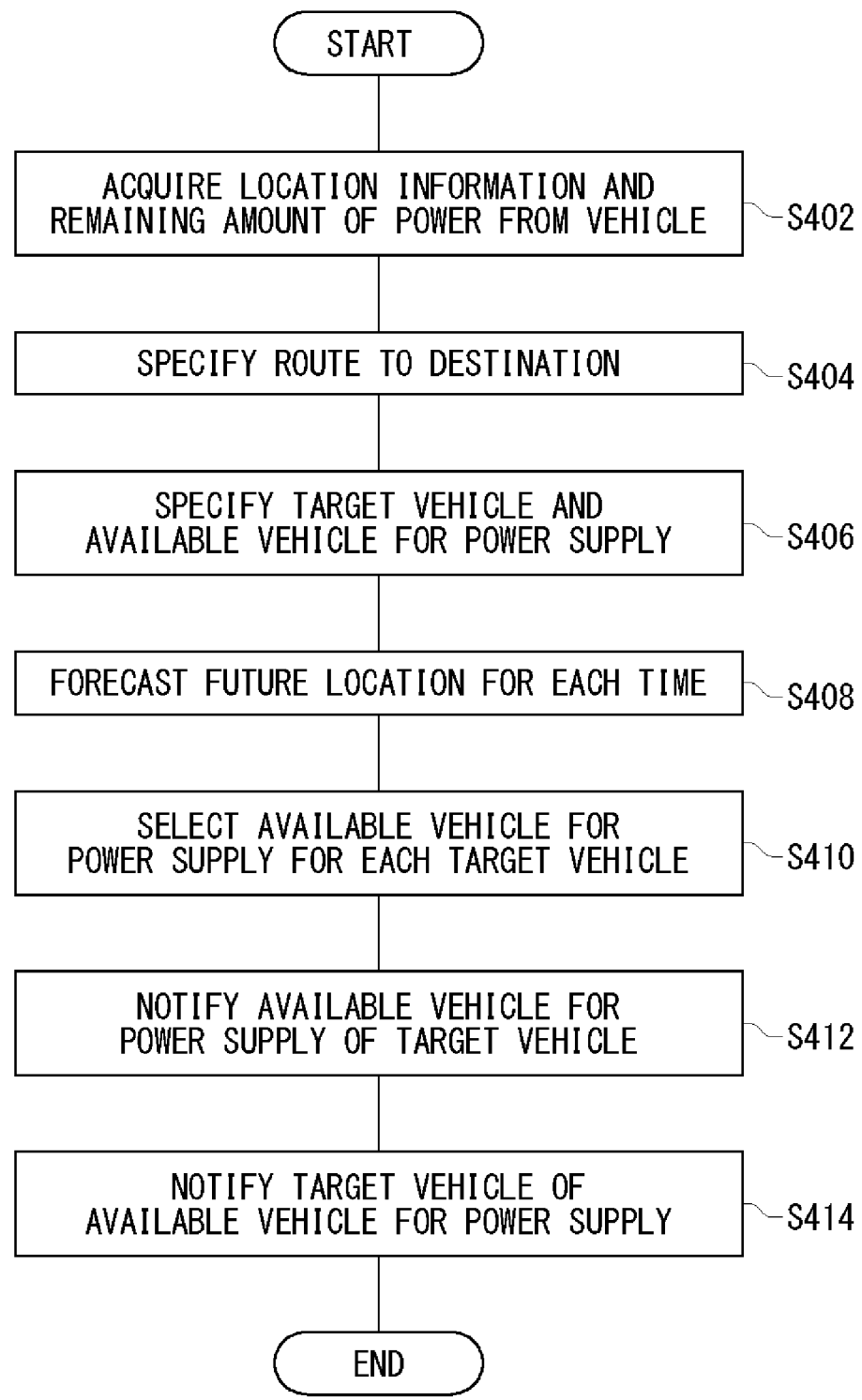
FIG. 4 shows a diagram showing one example of a process performed by a vehicle assistance server 20.

FIG. 4 shows one example of a process performed by the vehicle assistance server 20. The information acquiring part 100 acquires data about location information containing a current location, a relay point and a destination, and the remaining capacity of the battery 280 at regular intervals from each vehicle 10 (step S402). The route specifying part 110 specifies a future route (step S404). The process in step S404 is the same as that performed in step S306 of FIG. 3.

The analyzing part 105 specifies a target vehicle and an available vehicle for power supply in step S406. As an example, the analyzing part 105 may follow the same steps as those in steps S308 and S310 of FIG. 3 to calculate the amount of power to be consumed and a surplus amount of power and compare the calculated surplus amount of power with a margin, thereby classifying the vehicles 10 as a target vehicle and an available vehicle for power supply.

The meeting point specifying part 140 forecasts the future locations of the target vehicle and the available vehicle for power supply for each future time (step S408). As an example, the meeting point specifying part 140 can forecast the future location of each vehicle for each future time based on the route specified in step S404 and an average speed. The vehicle selecting part 130 selects an available vehicle for power supply for each target vehicle in step S410. Next, the notifying part 160 notifies the available vehicle for power supply of the target vehicle (step S412), and notifies the target vehicle of the available vehicle for power supply (step S414). When the available vehicle for power supply is notified of the target vehicle in S412, if the available vehicle for power supply does not wish to be notified as an available vehicle for power supply, the notifying part 160 may not notify the target vehicle of the available vehicle for power supply in step S414.

FIG. 5 shows one example of data in a table format about power consumption efficiency stored in the storage part 150. The storage part 150 stores a reference value of power consumption efficiency in association with vehicle type ID information for identifying a vehicle type, section ID information for identifying a section of a road a vehicle 10 can travel, seasonal information for indicating a season, weather information for indicating weather, and time frame information for indicating a time frame.

The vehicle type ID may be information for indicating a vehicle form, for example. As an example, the vehicle type ID may be a form designation number and the like if a vehicle 10 is an automobile. However, the vehicle type ID may be any information as long as the information can take a difference in power consumption efficiency between vehicle types into consideration.

The section ID may be information for identifying a section of each road used for calculation of a route by a navigation system, used by the Vehicle Information and Communication System (VICS), and the like. An open road and an expressway may be given different section IDs even if they are on the same road. This makes it possible to precisely consider a difference in power consumption efficiency between travel on the open road and travel on the expressway. Open roads may be given different section IDs as long as they form different routes. Likewise, expressways may be given different section IDs as long as they form different routes.

The seasonal information may be information for identifying one of the four seasons, for example. The seasonal information may be any information as long as it identifies a temporal section of a year. Examples of the seasonal information include information for identifying the first to fourth quarters of a year and information for identifying a month. Examples of the weather information include information for identifying weather such as fair weather, rainy weather and cloudy weather, and information for identifying the measurable physical quantity of the atmosphere such as temperature and humidity. The time frame information may be information for identifying a time frame such as morning hours, daytime hours, early-evening hours, and nighttime hours, for example. The time frame information may be any information as long as it identifies a temporal section of a day. As an example, the time frame information may be information for identifying a temporal section in units of 60 minutes.

A power consumption rate may be a numerical value indicating a distance a vehicle can travel with a unit amount of power. The numerical value of the power consumption rate may simply be a coefficient of a power consumption rate relative to Japan's 10-15 mode fuel efficiency. As an example, a difference in power consumption rate between upgrade and downgrade sections of a road may be expressed by simply using such coefficient information. The vehicle assistance system 50 can acquire parameters regarding a power consumption rate such as the current location and the remaining capacity of a vehicle 10, and can even acquire the power consumption rate itself of a vehicle 10. Thus, the power consumption rate may be an average value of power consumption rates calculated from parameters acquired from a plurality of vehicles, or may be an average value of power consumption rates acquired from the plurality of vehicles. This may make it possible to obtain a practical power consumption rate.

The power amount specifying part 120 can calculate the amount of power to be consumed if a vehicle travels on a future route by using the information given in the aforementioned example. As an example, the power amount specifying part 120 selects a power consumption rate stored in association with a vehicle type ID corresponding to vehicle type information, a section ID corresponding to a link, a season current date and time belongs to, weather corresponding to current or future weather or temperature, and a time frame current time or future time belongs to. The power amount specifying part 120 selects a power consumption rate for each of one or more links to form a future route, and divides a distance of a corresponding link by the selected power consumption rate. The power amount specifying part 120 adds the divided values of the links to form the future route, thereby calculating the amount of power to be consumed.

Figure 6:
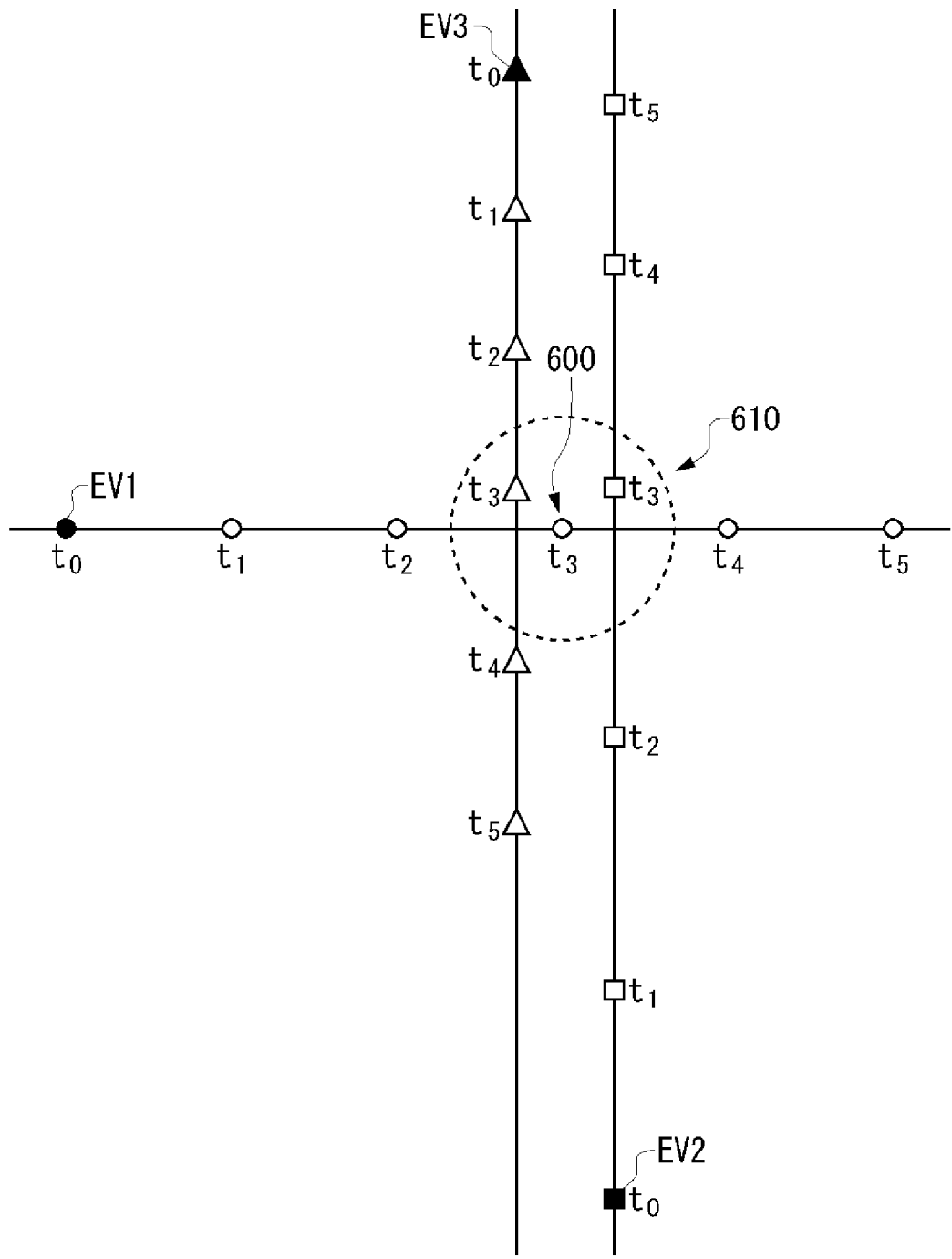
FIG. 6 shows a diagram schematically showing a process for specifying a meeting point and a process for selecting a vehicle.

FIG. 6 schematically shows a process performed by the meeting point specifying part 140 and the vehicle selecting part 130. Reference marks EV1, EV2 and EV3 of FIG. 6 show the locations of the vehicle 10a as a target vehicle, and of the vehicles 10b and 10c as available vehicles for power supply, respectively. Straight lines shown in FIG. 6 indicate routes the vehicles 10 travel. Black marks indicate the locations at a current time t0, namely the current locations of the vehicles 10.

The meeting point specifying part 140 divides a period from a current time to the battery exhaustion of the vehicle 10a into segments of a certain duration, and forecasts the location of the vehicle 10a at each time point. As an example, the meeting point specifying part 140 calculates future locations at future times t1, t2, t3, t4 and t5. The meeting point specifying part 140 can calculate a future location at each time point based on a current time, the current location and the speed of the vehicle 10a, a future time, and a future route for the vehicle 10a. As already described above, the speed of the vehicle 10a may be an average speed in a link to form a route.

The meeting point specifying part 140 also calculates future locations at future times t1, t2, t3, t4 and t5 for each of the vehicles 10b and 10c. If a different vehicle 10 is to be at its calculated future location at each future time that is, for example, in an area within a radius of five kilometers of the location of the vehicle 10a, the meeting point specifying part 140 specifies this area as an expected meeting area. The vehicle selecting part 130 selects a vehicle 10 in this expected meeting area as an available vehicle for power supply. In this example, the future locations of the vehicles 10b and 10c are in an area 610 within a radius of five kilometers of a future location 600 of the vehicle 10a at the future time t3 as shown in FIG. 6. Accordingly, the meeting point specifying part 140 specifies the area 610 as an expected meeting area, and the vehicle selecting part 130 selects the vehicles 10b and 10c as available vehicles for power supply.

A future location is forecasted as one point in this example for simplification of the description. Accordingly, an area to be set within a radius of five kilometers of a future location becomes a circular area with a radius of five kilometers. The meeting point specifying part 140 may alternatively forecast a future location as a plurality of points or a line segment of a certain length instead of a one-point future location. As an example, the meeting point specifying part 140 may forecast a future location in consideration of a predetermined error of an average speed. More specifically, the meeting point specifying part 140 may forecast a future location forming a line segment of a length responsive to such an error, and may set an area within a predetermined distance from the line segment indicating the future location.

The meeting point specifying part 140 may also forecast a future location for a different vehicle 10 that forms a line segment on its route. In this case, the vehicle selecting part 130 may select a vehicle 10 as an available vehicle for power supply the forecasted future location of which is at least in part within an area determined from the future location of the vehicle 10a.

A plurality of routes may lead to the same destination or same relay point. In this case, in consideration of the presence of the plurality of routes other than an error of an average speed, a future location can be expected as one point on each of the plurality of routes. Or, a future location can be forecasted as the aforementioned line segment on each of the plurality of routes.

While an area to be set is described as being within a radius of five kilometers, an area to be set is not limited to an area within a radius of five kilometers, but may be an area within any distance from the vehicle 10a. If vehicles 10 are in the area of the vehicle 10a and travel on routes not intersecting each other, they will not be selected as available vehicles for power supply. It is assumed, for example, that the vehicle 10a is to travel on a route along an open road while the vehicle 10c is to travel on a route along an expressway. In this case, the vehicle 10c will not be selected as an available vehicle to supply power to the vehicle 10a. Accordingly, the notifying part 160 can notify a point an available vehicle for power supply and a target vehicle pass through simultaneously after determining if a route is along an expressway or an open road.

The process performed by the meeting point specifying part 140 and the vehicle selecting part 130 described in this example makes it possible to forecast a time when an available vehicle for power supply and a target vehicle are to meet each other and an area where the available vehicle for power supply and the target vehicle are to meet. This prevents the available vehicle for power supply and the target vehicle from going past an area where they are to meet each other. Thus, the vehicle assistance system 50 allows the available vehicle for power supply and the target vehicle to meet each other without fail while shorting waiting time for the meeting.

Figure 7:
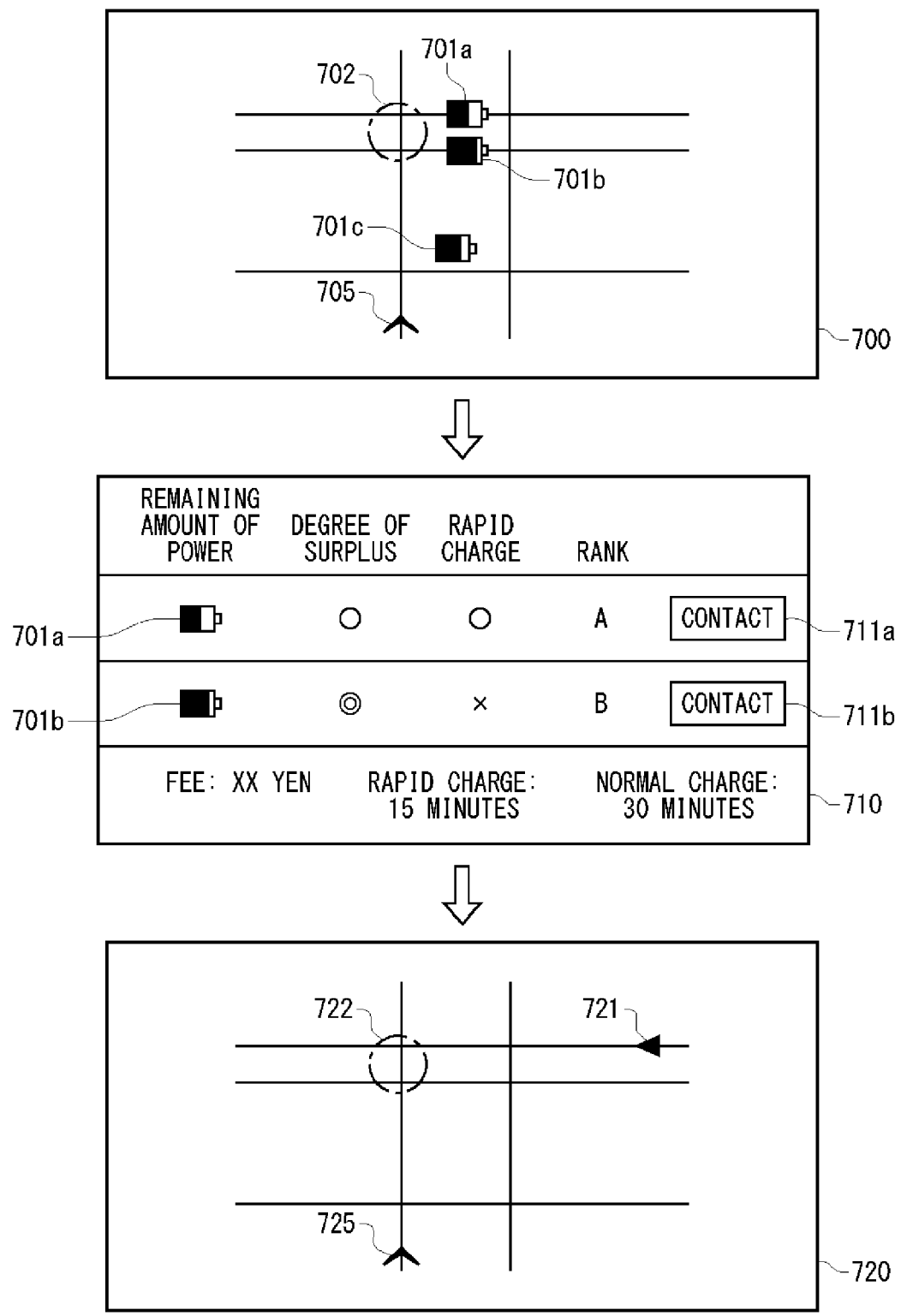
FIG. 7 shows a diagram showing one example of a transition of navigation screens of a target vehicle.

FIG. 7 shows an example of a transition of navigation screens of a target vehicle. The example shows navigation screens displayed on the display part 270 of the vehicle 10a. Here, a display device providing a display function of the display part 270 and a manipulated input device providing a touch manipulation of the input part 202 are integrated into one to form a touch panel structure.

An own-vehicle location object 705 on a map screen 700 is a display object indicating the traveling direction and the location of the vehicle 10a. An expected meeting area 702 is an object indicating an expected meeting area described with reference to FIG. 6. The display part 270 displays the expected meeting area 702 superimposed on the map objects if the meeting point specifying part 140 specifies an expected meeting area. The display part 270 informs a passenger of the vehicle 10a of the presence of an available vehicle for power supply the vehicle 10a can meet in the expected meeting area 702 by displaying the expected meeting area 702.

The display part 270 displays vehicle objects 701a, 701b and 701c superimposed on the map objects. The vehicle objects 701a, 701b and 701c are displayed in the form of objects indicating the remaining capacities of the corresponding batteries 280. Accordingly, it is immediately seen that a vehicle 10 indicated by the vehicle object 701b has larger remaining capacity than a vehicle 10 indicated by the vehicle object 701*a*. The vehicle objects 701*a* and 701*b* are displayed near the expected meeting area 702. This allows a passenger of the vehicle 10*a* to recognize at a glance that there are two vehicles the vehicle 10*a* can meet with high probability in the expected meeting area 702. A passenger of the vehicle 10*a* is also allowed to recognize at a glance that the vehicle 10*a* is unlikely to meet a vehicle indicated by the vehicle object 701*c* as there is no expected meeting area displayed near the vehicle object 701*c*.

A screen on the display part 270 is changed to a vehicle information screen 710 on which information about available vehicles for power supply are displayed in a list format in response to touch of the expected meeting area 702 on the map screen 700 by a passenger of the vehicle 10*a*. The vehicle information screen 710 contains information about available vehicles for power supply in a list format the vehicle 10*a* can meet in the touched area. The vehicle information screen 710 includes a vehicle object 701 indicating remaining capacity, information about a surplus of remaining capacity, information about the possibility of rapid charge, rank information, and a contact bottom 711. The surplus information indicates the degree of a surplus of the remaining capacity of the battery 280 of each vehicle. As an example, a ratio of the amount of available power to be supplied to the amount of fully charged power can be used as an index of the degree of a surplus. The display part 270 shows the degree of a surplus by a suitable mark. This allows a passenger of the vehicle 10*a* to know available capacity for power supply at a glance.

The display part 270 shows the information about the possibility of rapid charge by displaying marks different between the case allowing rapid charge from a counterpart vehicle, and the case not allowing rapid charge. The rapid charge mentioned here is not limited to general rapid charge, but it means charge completed within a shorter time than normal charge and performed in any methods including increase of a charging voltage compared to that during normal charge. The display part 270 displays a mark indicating that rapid charge is feasible on condition that the vehicle 10*a* and a counterpart vehicle are both ready for rapid charge. Rapid charge is not feasible if the battery 280 itself is not ready for rapid charge or rapid discharge, for example. Rapid charge is also not feasible if at least either the vehicle 10*a* or a counterpart vehicle does not allow rapid charge or rapid discharge, for example. Rapid charge is not feasible either if both the charging cables 290 carried in the vehicle 10*a* and a counterpart vehicle do not have a function of rapid charge. A passenger of the vehicle 10*a* can immediately know the possibility of rapid charge from the aforementioned mark.

The display part 270 shows the rank information by displaying a mark indicating the confidence level of a user of a vehicle 10. The number of times of provision indicating the number of times a vehicle 10 provided power to a different vehicle, the frequency of provision indicating the frequency the vehicle 10 provided power to a different vehicle, a rate of provision obtained by dividing the aforementioned number of times of provision by the number of times the vehicle 10 consented to provision of power, and the like may be used as an index of the confidence level. The confidence level can be increased as the number of times of provision, the frequency of provision, or the rate of provision becomes higher. The number of times a vehicle 10 provided power within a predetermined period of time may be used as an index of the frequency of provision. Further, information about subjective estimation, which is formed by a user of a vehicle 10 and is to be granted to a user of a different vehicle, may be used as an index of the confidence level. Such subjective estimation is formed based on impression the user of the vehicle 10 received when contacting the user of the different vehicle. The vehicle assistance server 20 may acquire information about subjective estimation a user of a vehicle 10 entered into a vehicle-mounted navigation device from the vehicle-mounted navigation device. The vehicle assistance server 20 may alternatively acquire information about subjective estimation a user of a vehicle 10 entered into a smartphone, a personal digital assistant (PDA), a personal computer and the like in addition to a vehicle-mounted navigation device. The aforementioned rank information may be stored in the storage part 150 of the vehicle assistance server 20.

The vehicle information screen 710 of this example causes a passenger of the vehicle 10*a* to select a vehicle 10 the passenger actually intends to ask for power supply with reference to the rank information, so that a vehicle to be selected has a high confidence level. As an example, a vehicle can be selected in consideration of whether the vehicle to be selected has rich experience in provision of power, whether the vehicle to be selected has recently provided power at frequent intervals, or whether the vehicle to be selected is sure to come to a meeting point once the vehicle consents to provision of power. If the aforementioned rank information is given to the vehicle to be selected, the vehicle to be selected may be motivated to provide power to a different vehicle. The vehicle to be selected may also be motivated to make sincere response once it consents to provision of power.

The display part 270 also shows a fee, a time required for rapid charge, and a time required for normal charge. A fee may be calculated by multiplying the amount of power shortage by a unit cost of power. Each required time is a time required for rapid charge to compensate for the amount of power shortage or a time required for normal charge to compensate for the same amount of power shortage. Thus, a passenger of the vehicle 10*a* can easily know a fee to be charged and waiting time for charge.

Contact buttons 711*a* and 711*b* are button objects through which contact is made to a vehicle 10 concerned. Touch of the display position of the contact button 711*a* transmits a request to the vehicle assistance server 20 asking the vehicle 10*b* concerned for provision of power. When receiving the request, the vehicle assistance server 20 notifies the vehicle 10*b* of the request from a target vehicle. As described, the vehicle assistance system 50 makes the vehicle assistance server 20 take charge of an initial contact, thereby reducing psychological burdens of passengers of the vehicles 10*a* and 10*b* compared to the case where the these passengers directly contact each other for the first time.

A map screen 720 is a navigation screen appearing when a passenger of an available vehicle for power supply consents to provision of power. The map screen 720 includes an own-vehicle location object 725, an expected meeting area 722, and a different-vehicle location object 721 superimposed on the map objects. The own-vehicle location object 725 is a display object indicating the traveling direction and the location of the vehicle 10*a*. The different-vehicle location object 721 is a display object indicating the traveling direction and the location of the vehicle 10*b* having consented to provision of power. The expected meeting area 722 indicates an expected meeting area described with reference to FIG. 6. The map screen 720 allows a passenger of a vehicle 10 to recognize at a glance the current location and the traveling direction of a counterpart vehicle, thereby reducing the probability of the vehicles passing by each other.

Figure 8:
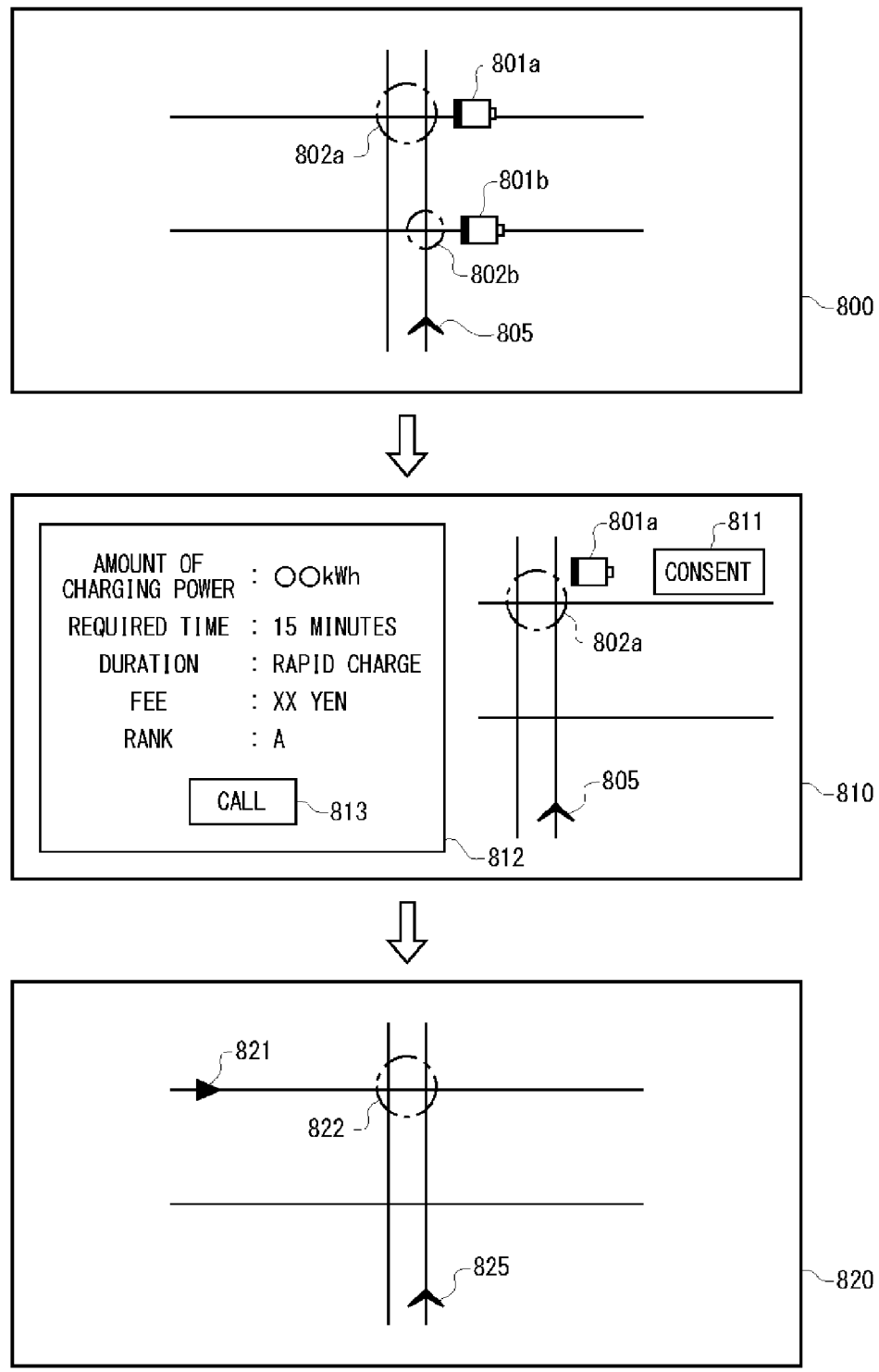
FIG. 8 shows a diagram showing one example of a transition of navigation screens of an available vehicle for power supply.

FIG. 8 shows an example of a transition of navigation screens of an available vehicle for power supply. The example shows navigation screens displayed on the display part 270 of the vehicle 10b. Like in the vehicle 10a, a touch panel structure is formed in the vehicle 10b by the display part 270 and the input part 202.

An own-vehicle location object 805 on a map screen 800 is a display object indicating the traveling direction and the location of the vehicle 10b. An expected meeting area 802a is a display object corresponding to the expected meeting area 702 of FIG. 7, and indicating an expected meeting area described with reference to FIG. 6. The display part 270 displays the expected meeting area 802a superimposed on the map objects if the meeting point specifying part 140 specifies an expected meeting area. The display part 270 informs a passenger of the vehicle 10b of the presence of a target vehicle the vehicle 10b can meet with high probability in the expected meeting area 802a by displaying the expected meeting area 802a. A vehicle object 801b shown in FIG. 8 also indicates a vehicle specified as a target vehicle. It is seen immediately that the vehicle 10b can meet a vehicle indicated by the vehicle object 801b with high probability in an expected meeting area 802b.

The display part 270 displays vehicle objects 801a and 801b superimposed on the map objects. The vehicle object 801 is displayed in the form of an object indicating the remaining capacity of the battery 280, so that the shortness of remaining capacity is recognized immediately.

As is already described in association with the vehicle information screen 710 of FIG. 7, in response to touch of the contact button 711a by a passenger of the vehicle 10a as a target vehicle, the notifying part 160 of the vehicle assistance server 20 notifies the selected vehicle 10b of the fact that the target vehicle has requested supply of charging power. More specifically, the information acquiring part 100 of the vehicle assistance server 20 acquires selection information indicating a vehicle 10 selected by the target vehicle as a vehicle to supply charging power to the target vehicle from available vehicles for power supply notified by the notifying part 160. Then, the notifying part 160 transmits a selection notification to the vehicle 10b indicated by the selection information, notifying the vehicle 10b of the fact that the vehicle 10b has been selected by the target vehicle. To be specific, the notifying part 160 transmits the selection notification asking for supply of charging power to a vehicle 10 indicated by the selection information.

After the different-vehicle information acquiring part 260 of the vehicle 10b receives the selection notification, the display part 270 of the vehicle 10b removes the vehicle object 801b while the vehicle object 801a corresponding to the vehicle 10a having transmitted the selection notification is left unremoved on the map screen 810. This makes it possible for a passenger of the vehicle 10b to recognize at a glance that a contact has been made from the vehicle 10a indicated by the vehicle object 801a. As shown in the example of FIG. 8, the display part 270 also displays a contact subscreen 812 and a consent button 811 while the subscreen 812 and the button 811 are superimposed on the map screen 810. The own-vehicle location object 805 and the expected meeting area 802a may be kept displayed while the contact subscreen 812 is shifted or made smaller so that the locations of the own-vehicle location object 805 and the expected meeting area 802a with respect to each other will not be hidden by the contact subscreen 812 and the consent button 811.

The contact subscreen 812 contains information about the vehicle 10a having made contact. The contact subscreen 812 contains information about the amount of charging power, information about required time, reward information, rank information, and a call button 813, for example. The amount of charging power corresponds to the amount of power shortage of the vehicle 10a. The information about required time includes expected time required for charge and a charging mode. The reward information includes the amount of reward obtained by providing the amount of power indicated by the information about the amount of charging power. The rank information is not described in detail here as it is the same as the rank information described with reference to FIG. 7, except for the point that the rank information mentioned here is the rank information about a user of the vehicle 10a. The call button 813 can be selected if a passenger of the vehicle 10b hopes to communicate with the vehicle 10a. Touch of the call button 813 originates a call from the communication part 208 of the vehicle 10b to the communication part 208 of the vehicle 10a through the mobile communications network 30, thereby allowing conversation between the passengers of the vehicles 10a and 10b. Thus, the passenger of the vehicle 10b can make an inquiry to the passenger of the vehicle 10a about the details of conditions for charge, or can make specifics clear.

A passenger of the vehicle 10b touches the consent button 811 if the request from the vehicle 10a is accepted. In response, the communication part 208 of the vehicle 10b transmits a message to the vehicle assistance server 20 indicating that the vehicle 10b has consented to power supply. To be specific, the information acquiring part 100 of the vehicle assistance server 20 receives consent information indicating consent of supply of charging power from the vehicle 10b having received the selection notification transmitted from the notifying part 160. When the consent information is received, the storage part 150 of the vehicle assistance server 20 stores information for identifying a vehicle to supply power that is the vehicle 10b having transmitted the consent information, and information for identifying a target vehicle in association with each other. The information stored in the storage part 150 is used for authentication described in detail later that is performed for actual charge with the charging cable 290. The vehicle assistance server 20 transmits a message to the vehicle 10a indicating that the passenger of the vehicle 10b has consented to supply of charging power.

A map screen 820 is a navigation screen appearing when a passenger of the vehicle 10b has consented to power supply. The map screen 820 includes an own-vehicle location object 825, an expected meeting area 822, and a different-vehicle location object 821 superimposed on the map objects. The own-vehicle location object 825 is a display object indicating the traveling direction and the location of the vehicle 10b. The different-vehicle location object 821 is a display object indicating the traveling direction and the location of the vehicle 10a as a target vehicle. The expected meeting area 822 indicates an expected meeting area corresponding to the expected meeting area 802a. The map screen 802 does not include the expected meeting area 802b displayed on the map screen 800 as the vehicle 10b has consented to power supply to the vehicle 10a when the map screen 820 is displayed. The map screen 820 allows a passenger of a vehicle 10 to recognize at a glance the current location and the traveling direction of a counterpart vehicle, thereby reducing the probability of the vehicles passing by each other.

Figures 9, 10:
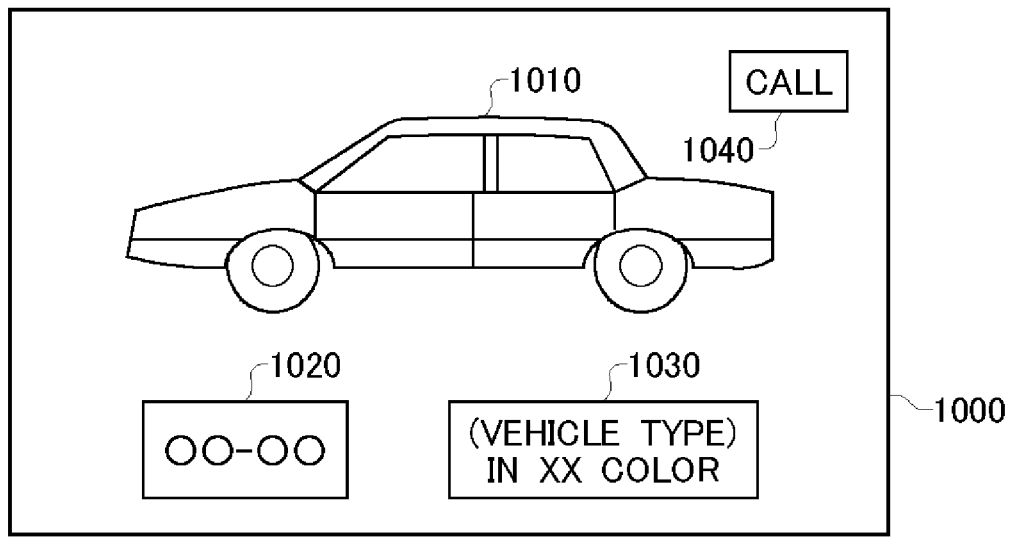
FIG. 9 shows a diagram showing an example of data about a relationship between supply and demand of charging power in a table format.
FIG. 10 shows a diagram schematically showing a counterpart vehicle information screen 1000.

FIG. 9 shows an example of information in a table format about a relationship between supply and demand of charging power stored in the storage part 150. As described with reference to FIG. 8, the vehicle assistance server 20 controls the vehicle 10b as a vehicle to supply power if a passenger of the vehicle 10b consents to power supply to the battery 280 of the vehicle 10a. More specifically, the storage part 150 stores information for identifying the vehicle 10b as a vehicle to supply power, and information for identifying the vehicle 10a as a target vehicle. To be more specific, the storage part 150 stores information for identifying the vehicle 10*b* as a vehicle to supply power, and information for identifying the vehicle 10*a* as a target vehicle in association with the amount of charging power. Information for identifying a vehicle 10 may be a vehicle identification number contained in diagnostic data, for example. The storage part 150 may additionally store information for specifying the amount of charging power, for specifying the feasibility of rapid charge, and the like.

FIG. 10 schematically shows a counterpart vehicle information screen 1000 as an example of a navigation screen, which is a navigation screen displayed on the display part 270 of the vehicle 10*b*, for example. The counterpart vehicle information screen 1000 in this example can be referred to for allowing smooth meeting of the vehicles 10*a* and 10*b*. The display part 270 of the vehicle 10*b* displays the image screen of the vehicle 10*a* in order for a passenger of the vehicle 10*b* to find the vehicle 10*a* easily.

A number object 1020 on the counterpart vehicle information screen 1000 is an object indicating a license plate. The license plate is a car registration plate if a vehicle 10 is a registered car, and is a vehicle number plate if the vehicle 10 is a vehicle of a different type such as a light automobile and a two-wheeled motor vehicle. A vehicle type information object 1030 is an object indicating a body color and a vehicle type. A vehicle object 1010 is an object indicating the body image of the vehicle 10*a*. A call button 1040 is a button object for making conversation with a passenger of the vehicle 10*a*.

The vehicle assistance server 20 acquires information in advance for specifying a vehicle type, a body color, and a license plate number from the vehicle 10*a*, and stores the acquired information in advance into the storage part 150. The vehicle assistance server 20 reads the information for specifying the vehicle type, the body color, and the license plate number of the vehicle 10*a* from the storage part 150, and transmits the read information to the vehicle 10*b*. The display part 270 displays the number object 1020 responsive to the license plate number transmitted from the vehicle assistance server 20. The display part 270 also displays the vehicle type information object 1030 based on the body color and the vehicle type information transmitted from the vehicle assistance server 20. The vehicle type information object 1030 includes a text image with characters indicating a body color, and a text image with characters indicating a vehicle type.

The display part 270 further displays the vehicle object 1010 based on the vehicle type and the body color transmitted from the vehicle assistance server 20. More specifically, the vehicle object 1010 may be displayed on the display part 270 in which a vehicle shape object indicating the shape of a vehicle given in the vehicle type information and colored in the body color is displayed. The vehicle object 1010 may be created by the vehicle assistance server 20 and then transmitted to the vehicle 10*b*, or may be created by the vehicle 10*b*. The image of the vehicle object 1010 may be a photographic image formed by capturing the image of the vehicle 10*a* itself. Such a photographic image may be acquired from the vehicle 10*a*, and stored in the storage part 150 in advance, for example. The vehicle assistance server 20 may present the photographic image of the vehicle 10*a* to a passenger of the vehicle 10*b* by transmitting the photographic image to the vehicle 10*b*.

A passenger of the vehicle 10*b* can immediately know that the vehicle 10*a* has passed through a nearby location from the vehicle object 1010 displayed on the display part 270. Supposing that a different vehicle of the same type and in the same color as the vehicle 10*a* or a vehicle similar to the vehicle 10*a* has passed through a nearby location, the passenger of the vehicle 10*b* can readily determine without fail if such a vehicle is the vehicle 10*a* or not based on the information in the number object 1020. Touch of the call button 1040 on the counterpart vehicle information screen 1000 originates a call from the communication part 208 of the vehicle 10*b* to the communication part 208 of the vehicle 10*a* through the mobile communications network 30, thereby allowing conversation between the passengers of the vehicles 10*a* and 10*b*. This allows both the passengers to make inquiries to the counterparts as to a particular meeting point, for example, so that the vehicles 10*a* and 10*b* can meet each other smoothly.

Figure 11:
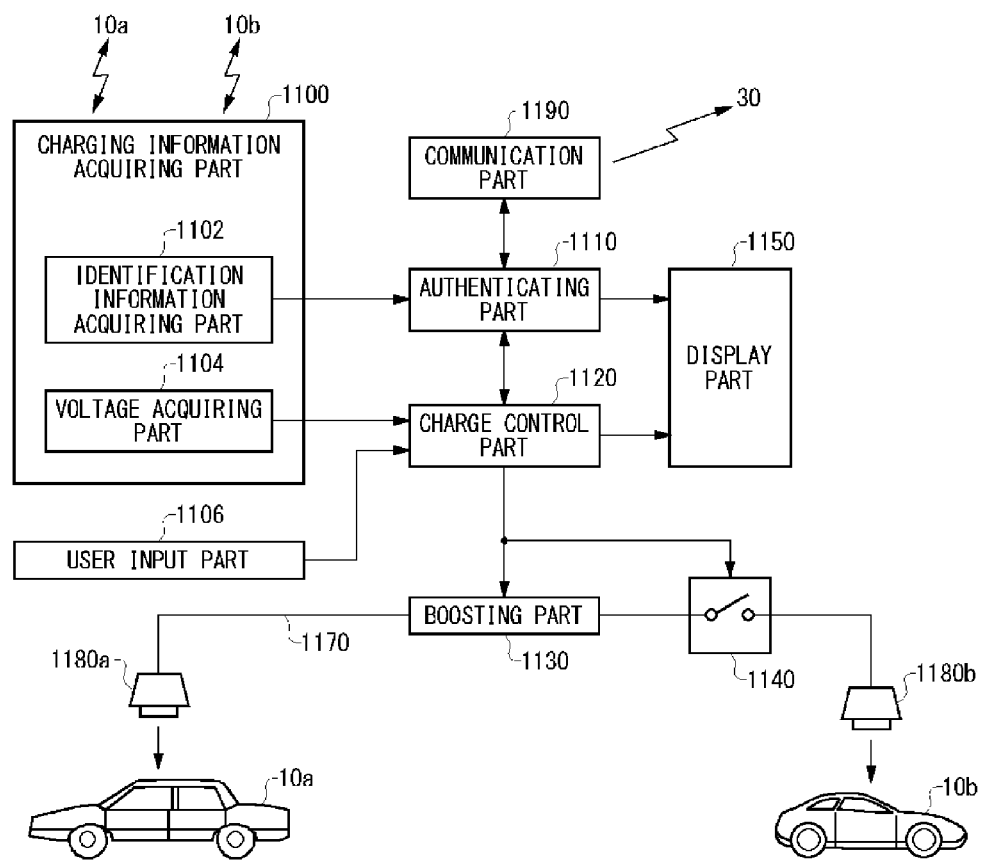
FIG. 11 shows a diagram schematically showing one example of a block structure of a charging cable 290.

FIG. 11 schematically shows one example of a block structure of the charging cable 290 together with vehicles 10. The charging cable 290 of this example can charge the battery 280 of a vehicle 10 from the battery 280 of a different vehicle 10 by connecting the vehicles 10. The charging cable 290 provides what is called a charging cable for charge and discharge between vehicles. The charging cable 290 includes end connections 1180*a* and 1180*b*, a conductive line 1170, a boosting part 1130, a switching part 1140, a charge control part 1120, a charging information acquiring part 1100, a user input part 1106, an authenticating part 1110, and a display part 1150.

The end connections 1180*a* and 1180*b* are connected to different vehicles 10. Here, the end connections 1180*a* and 1180*b* are connected to the cable connecting parts 292 of the vehicles 10*a* and 10*b* respectively. The charging cable 290 receives electric energy stored in the battery 280 of the vehicle 10*b* at the end connection 1180*b*. When the switching part 1140 is closed, electric energy received at the end connection 1180*b* is transferred to the conductive line 1170, and is supplied through the end connection 1180*a* to the vehicle 10*a*. The end connections 1180*a* and 1180*b* may be connected to the vehicles 10*a* and 10*b*, respectively, via contact connectors or non-contact connectors. The boosting part 1130 is placed in the conductive line 1170. The boosting part 1130 raises a voltage generated at the end connection 1180*b*, and transfers the raised voltage to the end connection 1180*a* under control of the charge control part 1120. Opening and closing of the switching part 1140 is controlled by the charge control part 1120.

The charging information acquiring part 1100 includes an identification information acquiring part 1102 and a voltage acquiring part 1104. The identification information acquiring part 1102 and the voltage acquiring part 1104 can communicate with the vehicles 10*a* and 10*b*. Such communication may be realized as power line communication, or as Near Field Communication such as Bluetooth (registered trademark). The identification information acquiring part 1102 acquires first and second identification information for identifying the vehicles 10*a* and 10*b* from the vehicles 10*a* and 10*b* connected to the end connections 1180*a* and 1180*b*, respectively. The first and second identification information acquired by the identification information acquiring part 1102 are supplied to the authenticating part 1110. A communication part 1190 can communicate with the communication part 108 of the vehicle assistance server 20 through the mobile communications network 30. The authenticating part 1110 communicates with the vehicle assistance server 20 through the communication part 1190.

The authenticating part 1110 communicates with the vehicle assistance server 20 to determine if the vehicle assistance server 20 stores the second identification information in association with the first identification information. More specifically, the authenticating part 1110 communicates with the vehicle assistance server 20 to make the vehicle assistance server 20 determine if the second identification information is stored in association with the first identification information, and acquires a result of the determination. To be more specific, the authenticating part 1110 transmits the first and second identification information to the vehicle assistance server 20, and acquires a result of determination as to if the vehicle assistance server 20 stores the second identification information in association with the first identification information. As already described above, the vehicle assistance server 20 stores identification information for identifying the vehicle 10*b* to supply charging power to the battery 280 of the vehicle 10*a* in association with identification information for identifying the vehicle 10*a* with the battery 280 requiring charge in the storage part 150. In the vehicle assistance server 20, when the communication part 108 receives the first and second identification information, the authenticating part 170 determines if the storage part 150 stores the second identification information in association with the first identification information. If the storage part 150 does not store the second identification information in association with the first identification information, the authenticating part 170 transmits correctness information indicating that a result of the determination is "NO" to the charging cable 290 through the communication part 108. If the storage part 150 stores the second identification information in association with the first identification information, the authenticating part 170 transmits correctness information indicating that a result of the determination is "YES" and the amount of charting power to the charging cable 290 through the communication part 108. The communication part 108 may transmit information about the possibility of rapid charge or information about a fee responsive to the amount of charging power to the charging cable 290.

As described, the authenticating part 170 communicates with the charging cable 290 connected to the vehicles 10*a* and 10*b* to transmit information indicating the possibility of charge between the vehicles 10*a* and 10*b* to the charging cable 290. More specifically, the authenticating part 170 transmits information indicating permission for charge between the vehicles 10*a* and 10*b* to the charging cable 290 if the storage part 150 stores the information for identifying the vehicle 10*a* and the information for identifying the vehicle 10*b* in association with each other.

The authenticating part 1110 makes the display part 1150 display an indication of failure of authentication of charge between vehicles if the correctness information received by the communication part 1190 indicates "NO." Then, the charge control part 1120 keeps the switching part 1140 opened. The authenticating part 1110 makes the display part 1150 display an indication of success of the authentication if the correctness information received by the communication part 1190 indicates "YES." Then, the authenticating part 1110 makes the display part 1150 display the amount of charging power, a fee responsive to the amount of charging power, and time required for charge. The charge control part 1120 opens the switching part 1140 to start charge after receiving instructions to start charge through the user input part 1106, for example.

After charge of a determined amount of power is completed, the charge control part 1120 opens the switching part 1140 to finish the charge. The communication part 1190 may notify the completion of charge thereafter. The communication part 1190 may make notification of the completion of charge to at least one of the vehicle assistance server 20, the vehicle 10*a*, the vehicle 10*b*, a mobile phone a passenger of the vehicle 10*a* carries, and a mobile phone a passenger of the vehicle 10*b* carries, for example. If notified of the completion of charge, the vehicle assistance server 20 may notify a mobile phone a passenger of a vehicle 10 carries of the completion of charge through the mobile communications network 30. The notification of the completion of charge may also be made to a navigation device of a vehicle 10. The completion of charge may be notified through Near Field Communication such as Bluetooth (registered trademark) that is also used by the charging information acquiring part 1100. The notification of the completion of charge to the mobile phone of the passenger of the vehicle 10 may be made at least through Bluetooth (registered trademark) or through the mobile communications network 30.

As described, the charge control part 1120 charges the battery 280 of the vehicle 10*a* with power from the battery 280 of the vehicle 10*b* through the end connections 1180*a* and 1180*b* if the aforementioned correctness information indicates "YES." To be specific, the charge control part 1120 charges the battery 280 of the vehicle 10*a* with power from the battery 280 of the vehicle 10*b* through the end connections 1180*a* and 1180*b* if the authenticating part 170 determines that the information providing device stores the second identification information in association with the first identification information.

The aforementioned control makes it possible to determine in advance if a vehicle 10 to be charged through the charging cable 290 and a vehicle 10 to supply power to the vehicle 10 to be charged are vehicles 10 that are correctly associated by the vehicle assistance server 20. Thus, a vehicle 10 will not be connected, and charged or used for charge mistakenly.

The voltage acquiring part 1104 communicates with the vehicle 10*a* to acquire the charging voltage of the battery 280 of the vehicle 10*a*. More specifically, the voltage acquiring part 1104 acquires a rapid charging voltage that is a charging voltage required for rapid charge of the battery 280 of the vehicle 10*a*. The voltage acquiring part 1104 also acquires a normal charging voltage that is a charging voltage required for normal charge of the battery 280 of the vehicle 10*a*. The charge control part 1120 controls the operation of the boosting part 1130 according to the charging voltage acquired by the voltage acquiring part 1104. More specifically, if the battery 280 of the vehicle 10*a* is to be charged rapidly and a voltage generated at the end connection 1180*b* is lower than a charging voltage for the rapid charge thereof, the charge control part 1120 raises the voltage generated at the end connection 1180*b* to the charging voltage for the rapid charge. For normal charge of the battery 280 of the vehicle 10*a*, the charge control part 1120 controls the boosting operation of the boosting part 1130 to maintain a charging voltage for normal charge. The boosting part 1130 may raise a voltage to a level about 10 percent higher than a target voltage. As described, the boosting part 1130 raises power from the battery 280 of the vehicle 10*b* to the charging voltage acquired by the voltage acquiring part 1104, and supplies the power to the battery 280 of the vehicle 10*a*.

Figure 12:
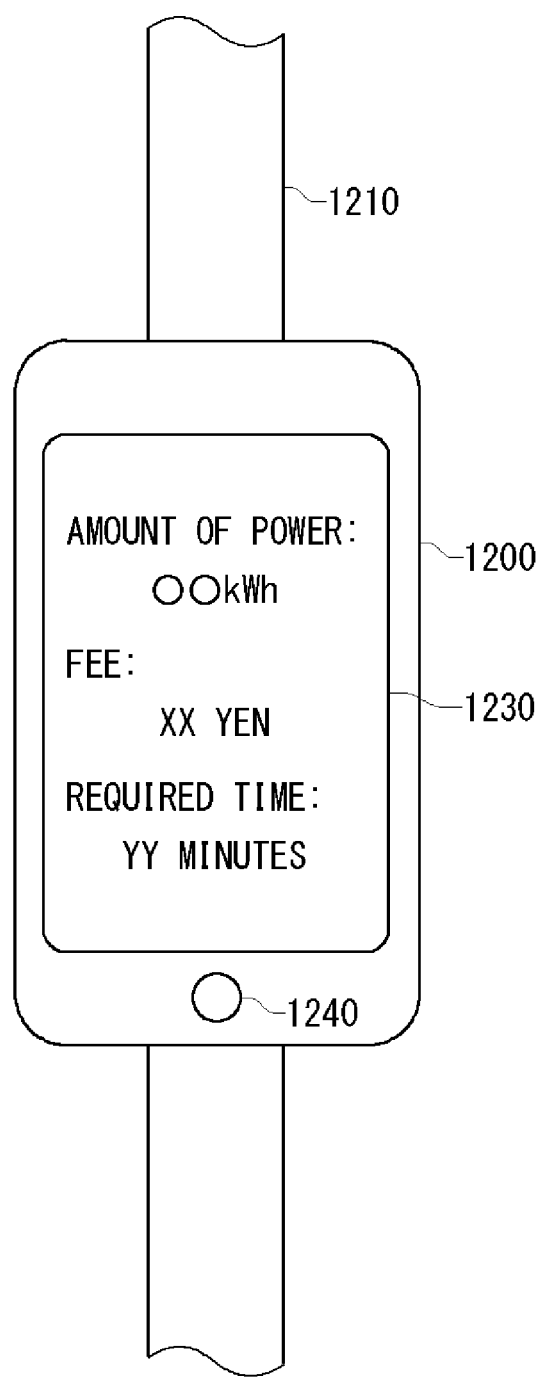
FIG. 12 shows a diagram schematically showing one example of an appearance of the charging cable 290.

FIG. 12 schematically shows one example of an appearance of the charging cable 290. FIG. 12 particularly shows a control box 1200 and its vicinity of the charging cable 290. The control box 1200 is coupled to a cable 1210. The cable 1210 encompasses the conductive line 1170. The boosting part 1130, the switching part 1140, the charge control part 1120, the charging information acquiring part 1100, the user input part 1106, the authenticating part 1110, and the display part 1150 described with reference to FIG. 11 are implemented in the control box 1200. The control box 1200 includes a monitor part 1230 which functions as part of the display part 1150 and is provided at a location capable of being recognized by a user. The control box 1200 also includes a switch 1240 which functions as part of the user input part 1106 and is provided at a location capable of being manipulated by a user.

As shown in FIG. 12, the monitor part 1230 displays the amount of charging power, a fee, and time required for charge. Passengers of the vehicles 10a and 10b can both see the content of charge from information displayed on the monitor part 1230. Charge is started under control by the charge control part 1120 in response to press of the switch 1240.

The description of the function and the operation of the vehicle assistance system 50 of the embodiment given above is based on the assumption that energy stored in the battery 280 is mainly used for travel of a vehicle 10. Meanwhile, the battery 280 of the vehicle 10 may not supply electric energy to the motor 282 for travel. The battery 280 may supply electric energy to a power load other than the motor 282 for travel such as an air-conditioning unit, a light, and a navigation device, for example. The vehicle 10 may not include the motor 282. Examples of the vehicle 10 include an automobile, a light automobile, and a two-wheeled motor vehicle. The vehicle 10 is not limited to an electric car, but it may alternatively be what is called a hybrid car that additionally includes an internal combustion engine. The vehicle 10 may include a different power source such as a fuel cell in addition to an internal combustion engine. Or, the vehicle 10 may be a vehicle of any types as long as the vehicle 10 includes the battery 280 and can carry a person. Accordingly, the vehicle 10 may be an electric train, an electric motorcycle and an electric bicycle, for example. The vehicle 10 may be supplied with power from an overhead line in addition to the battery 280 if the vehicle 10 is an electric train. The vehicle 10 may also be an electrically assisted motorcycle or an electrically assisted bicycle. Part of or all of the functional blocks of the vehicle assistance server 20 described above may be included in the vehicle 10. As an example, part of or all of the functional blocks of the vehicle assistance server 20 may be included in a navigation device of the vehicle 10. The example described above is based on the assumption that a vehicle 10 having a shortage of the remaining capacity of a battery is supplied with power from a different vehicle 10. The vehicle assistance server 20 may also have a function to guide the vehicle 10 having a shortage of the remaining capacity to the location of a nearest charging station, to the location of a nearest house with a charging unit, and the like based on the current location of the vehicle 10. The displays or presentations described above may also be transmitted to a passenger in the form of voice outputs, or if possible, may be transmitted only in the form of voice outputs.

Figure 13:
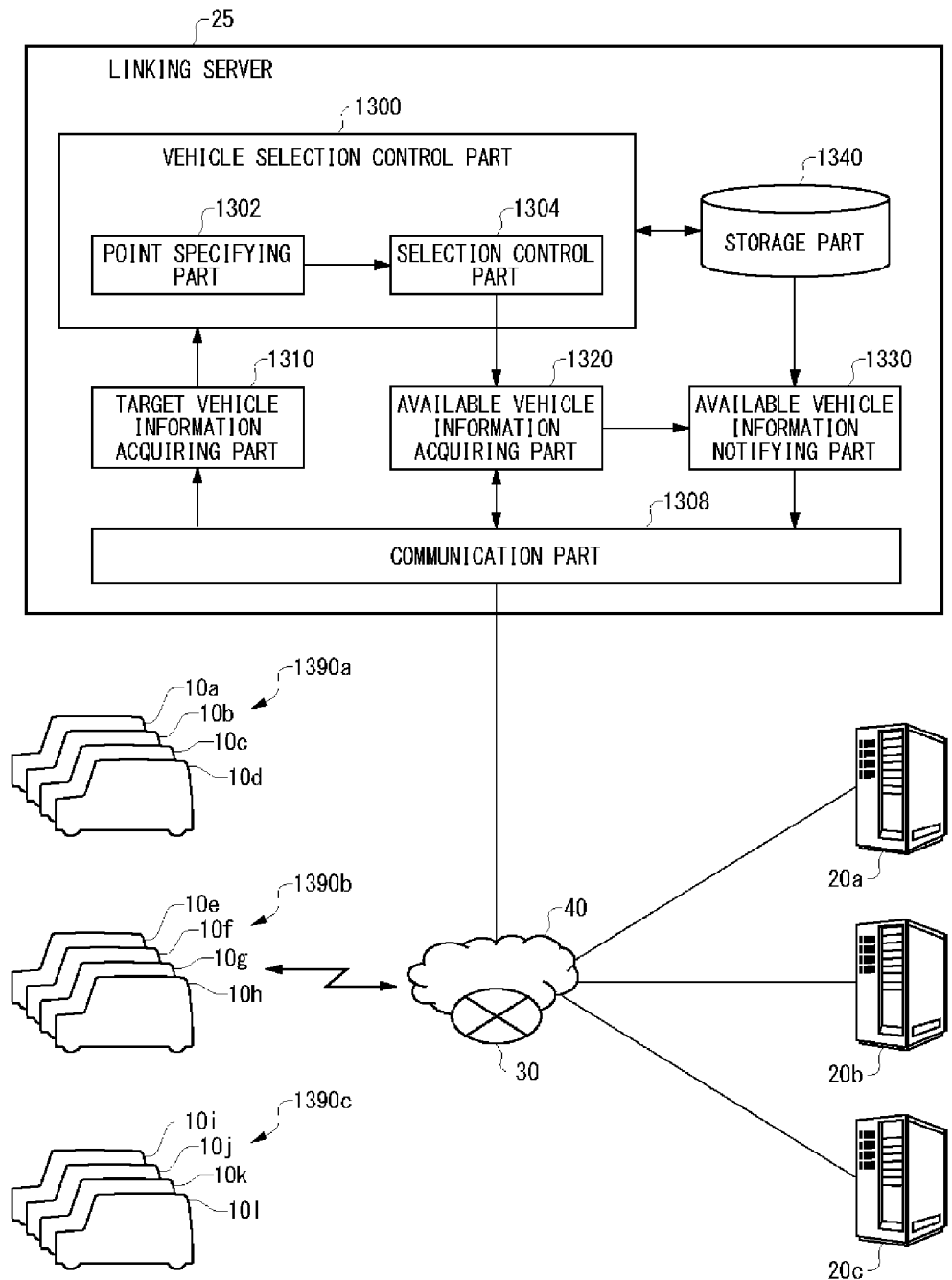
FIG. 13 shows a diagram showing the overall structure of a modification of a vehicle assistance system.

FIG. 13 shows the overall structure of a modification of a vehicle assistance system including a block structure. A vehicle assistance system 1350 includes a plurality of vehicles 10a to 10l, a plurality of vehicle assistance servers 20a to 20c, a mobile communications network 30, and a network 40. A linking server 25 includes a communication part 1308, a target vehicle information acquiring part 1310 for acquiring information about a target vehicle, a vehicle selection control part 1300, an available vehicle information acquiring part 1320 for acquiring information about an available vehicle for power supply, an available vehicle information notifying part 1330 for notifying information about an available vehicle for power supply, and a storage part 1340. The vehicle selection control part 1300 includes a point specifying part 1302 and a selection control part 1304.

The components of the vehicle assistance system 1350 having the same functions and operating in the same manners as those of the corresponding components of the vehicle assistance system 50 described with reference to FIGS. 1 to 12 are identified by the same reference numerals. The description of the function and the operation of each component of the vehicle assistance system 1350 is intended mainly for a difference from the vehicle assistance system 50.

The vehicle assistance server 20a corresponds to the vehicle assistance server 20 described with reference to FIGS. 1 to 12. The vehicle assistance server 20a has the same components as those of the vehicle assistance server 20. The vehicle assistance server 20a is intended to assist the vehicles 10a to 10d belonging to a predetermined group of vehicles 1390a. As an example, the vehicle assistance server 20a acquires information from each of the vehicles 10a to 10d belonging to the group of vehicles 1390a, the information including location information, the remaining capacity of a battery, and information about a route. Then, the vehicle assistance server 20a selects a target vehicle and an available vehicle for power supply from the vehicles 10a to 10d belonging to the group of vehicles 1390a.

The vehicle assistance servers 20b and 20c each acquire information from each of vehicles 10 belonging to a group of vehicles different from the group of vehicles 1390a, the information including location information, the remaining capacity of a battery, and information about a route to select a target vehicle and an available vehicle for power supply. More specifically, the vehicle assistance server 20b selects a target vehicle and an available vehicle for power supply from the vehicles 10e to 10h belonging to a group of vehicles 1390b. The vehicle assistance server 20c selects a target vehicle and an available vehicle for power supply from the vehicles 10i to 10l belonging to a group of vehicles 1390c. As described, the vehicle assistance servers 20a to 20c select available vehicles for supply from the corresponding groups of vehicles predetermined for the respective vehicle assistance servers. In other respects, the vehicle assistance servers 20 have the same function and operate in the same manner. The vehicle assistance servers 20a to 20c may collectively be called a vehicle assistance server 20 in the description of the vehicle assistance system 1350.

The components of the vehicle assistance servers 20a to 20c are identified by suffixes a, b and c in the description of the vehicle assistance system 1350. As an example, the vehicle assistance server 20a includes a vehicle selecting part 130a. Likewise, the vehicle assistance servers 20b and 20c include vehicle selecting parts 130b and 130c, respectively.

In the vehicle assistance system 1350, different groups of vehicles 1390 are allocated to the vehicle assistance servers 20a to 20c, respectively. As an example, vehicles 10 are categorized into groups of vehicles 1390 according to the manufacturers of the vehicles 10. In this case, the vehicle assistance servers 20a to 20c are operated by the corresponding manufacturers. Specifically, a vehicle assistance server 20 preferentially selects vehicles 10 that are manufactured by the same manufacturer as the vehicle assistance server 20 as an available vehicle for power supply. If the vehicle assistance server 20 cannot find an appropriate available vehicle for power supply from a group of vehicles 1390 allocated to the server 20, the vehicle assistance server 20 requests a different vehicle assistance server 20 to select an available vehicle for power supply through the linking server 25. The vehicle assistance servers 20a to 20c, and the linking server 25 are given APIs through which information, functions and the like are provided to outside.

The vehicle assistance server 20a transmits the current location of a target vehicle and the amount of power stored in the target vehicle to the linking server 25 if the vehicle selecting part 130a cannot select one or more vehicles 10 as available vehicles for power supply capable of supplying charging power to the target vehicle from the group of vehicles 1390a corresponding to the vehicle assistance server 20. Information indicating the current location and the amount of stored power about the target vehicle transmitted through a communication part 108a is received by the communication part 1308 of the linking server 25.

The target vehicle information acquiring part 1310 acquires the current location of a target vehicle and the amount of power stored in the target vehicle from the vehicle assistance server 20a, for example, through the communication part 1308. The vehicle selection control part 1300 makes each of the remaining vehicle assistance servers 20b and 20c of the plurality of vehicle assistance servers 20 select an available vehicle for power supply capable of supplying charging power to a power storage unit of the target vehicle based on the current location and the amount of stored power about the target vehicle.

The linking server 25 may make each of the vehicle assistance servers 20b and 20c select an available vehicle for power supply in consideration of the destination of a target vehicle. The target vehicle information acquiring part 1310 may acquire the current location, the amount of stored power, and the destination of the target vehicle from the vehicle assistance server 20a. Then, the vehicle selection control part 1300 may make each of the remaining vehicle assistance servers 20b and 20c select an available vehicle for power supply based on the current location, the amount of stored power, and the destination about the target vehicle.

More specifically, the point specifying part 1302 specifies a point a target vehicle can reach based on the current location, the amount of stored power, and the destination of a target vehicle. The point specifying part 1302 may specify a point a target vehicle can reach based on information about the target vehicle such as a route forecasted based on a current location and a destination and the fuel efficiency of each route. The information including the route and the fuel efficiency may be stored in the storage part 1340.

The selection control part 1304 notifies the remaining vehicle assistance servers 20 of a point specified by the point specifying part 1302, and makes each of the remaining vehicle assistance servers 20b and 20c select an available vehicle for power supply capable of supplying charging power to a target vehicle at the specified point. As an example, the selection control part 1304 makes the available vehicle information acquiring part 1320 notify of a point the target vehicle can reach, and acquire information about an available vehicle for power supply.

The available vehicle information acquiring part 1320 acquires information for specifying an available vehicle for power supply selected by each of the remaining vehicle assistance servers 20b and 20c from the vehicle assistance servers 20b and 20c. Then, the available vehicle information notifying part 1330 notifies the vehicle assistance server 20a of the available vehicle for power supply whose information has been acquired by the available vehicle information acquiring part 1320. More specifically, the available vehicle information notifying part 1330 notifies the vehicle assistance server 20a of the available vehicle for power supply through the communication part 1308. The linking server 25 allows an available vehicle for power supply to be selected from a broader range including vehicles 10 that are products of a different manufacturer, for example. The linking server 25 also allows extensive search for an available vehicle for power supply capable of meeting a target vehicle at an appropriate point based on the current location, the destination and the like of the target vehicle.

Figure 14:
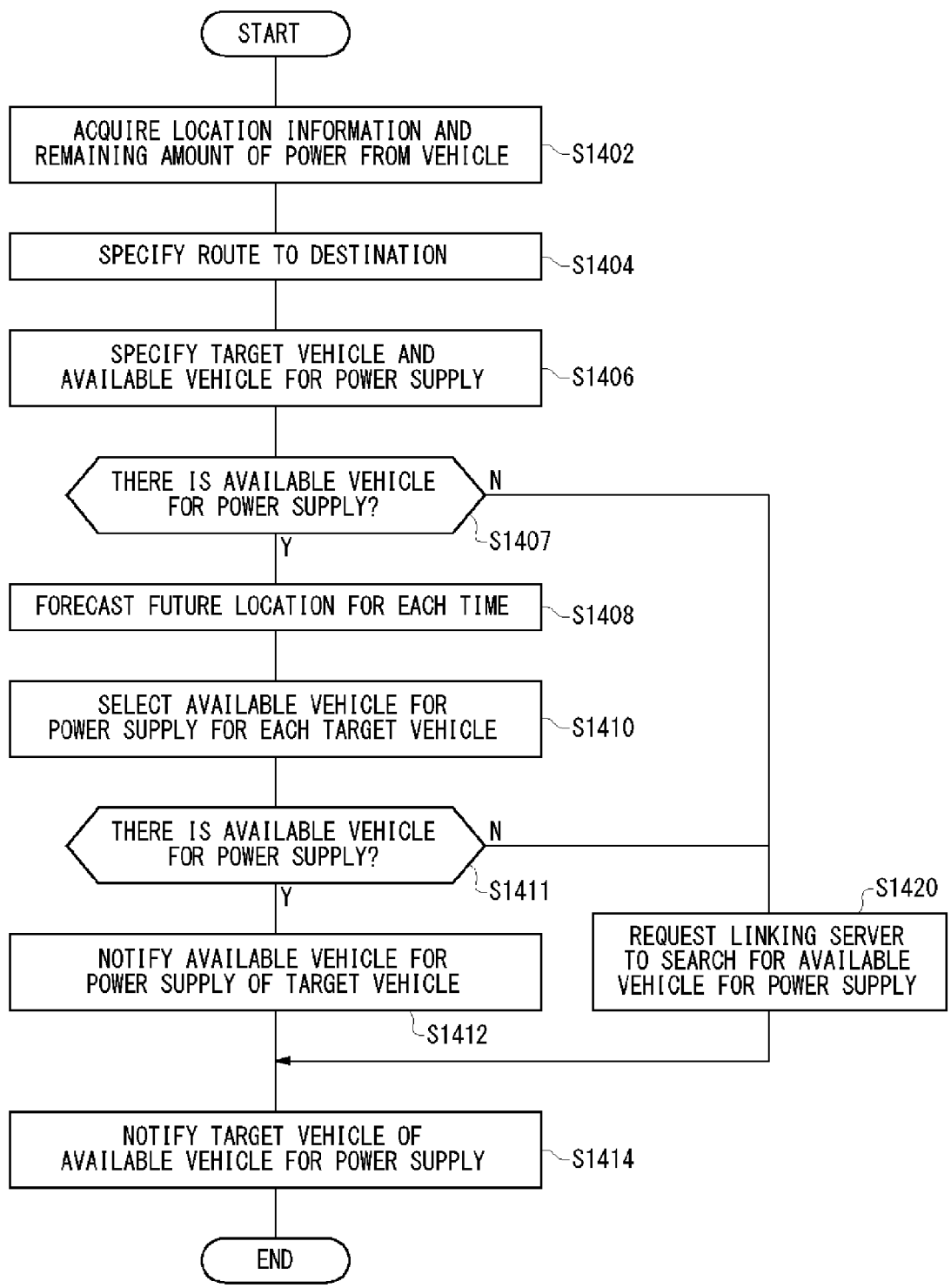
FIG. 14 shows a diagram showing one example of a process performed by a vehicle assistance server 20.

FIG. 14 shows one example of a process performed by a vehicle assistance server 20. The process of FIG. 14 is a modification of the process described with reference to FIG. 4. A description will now be given of the operation of the vehicle assistance server 20a mainly intended for a difference from the process described with reference to FIG. 4.

Steps S1402, S1404, S1406, S1408, S1410, S1412 and S1414 are process steps same as steps S402, S404, S406, S408, S410, S412 and S414 respectively, except for the point that steps S1402, S1404, S1406, S1408, S1410, S1412 and S1414 relate to the vehicle assistance server 20a and the group of vehicles 1390a.

Like in step S406, an analyzing part 105a specifies a target vehicle and an available vehicle for power supply in step S1406. Next, it is determined if the analyzing part 105a could specify a target vehicle and an available vehicle for power supply (step S1407). The process proceeds to step S1420 if the analyzing part 105a could not specify an available vehicle for power supply. The process proceeds to step S1408 if the analyzing part 105a could specify an available vehicle for power supply.

Like in step S410, the vehicle selecting part 130a selects an available vehicle for power supply for each target vehicle in step S1410. Next, it is determined if the vehicle selecting part 130a could select available vehicles for power supply for all the target vehicles (step S1411). The process proceeds to step S1420 if available vehicles for power supply could not be selected for all the target vehicles. The process proceeds to step S1412 if available vehicles for power supply could be selected for all the target vehicles.

In step S1420, the vehicle assistance server 20a requests the linking server 25 to search for an available vehicle for power supply for a target vehicle for which an available vehicle for power supply could not be selected. As an example, the vehicle assistance server 20a transmits information about the target vehicle including location information, the remaining capacity of a battery, a destination, information about a route to the linking server 25. Then, the vehicle assistance server 20a waits for notification of a result of the search from the linking server 25. After being notified of an available vehicle for power supply from the linking server 25, the vehicle assistance server 20a proceeds to step S1414 in which the vehicle assistance server 20a notifies the target vehicle of the available vehicle for power supply notified by the linking server 25.

Figure 15:
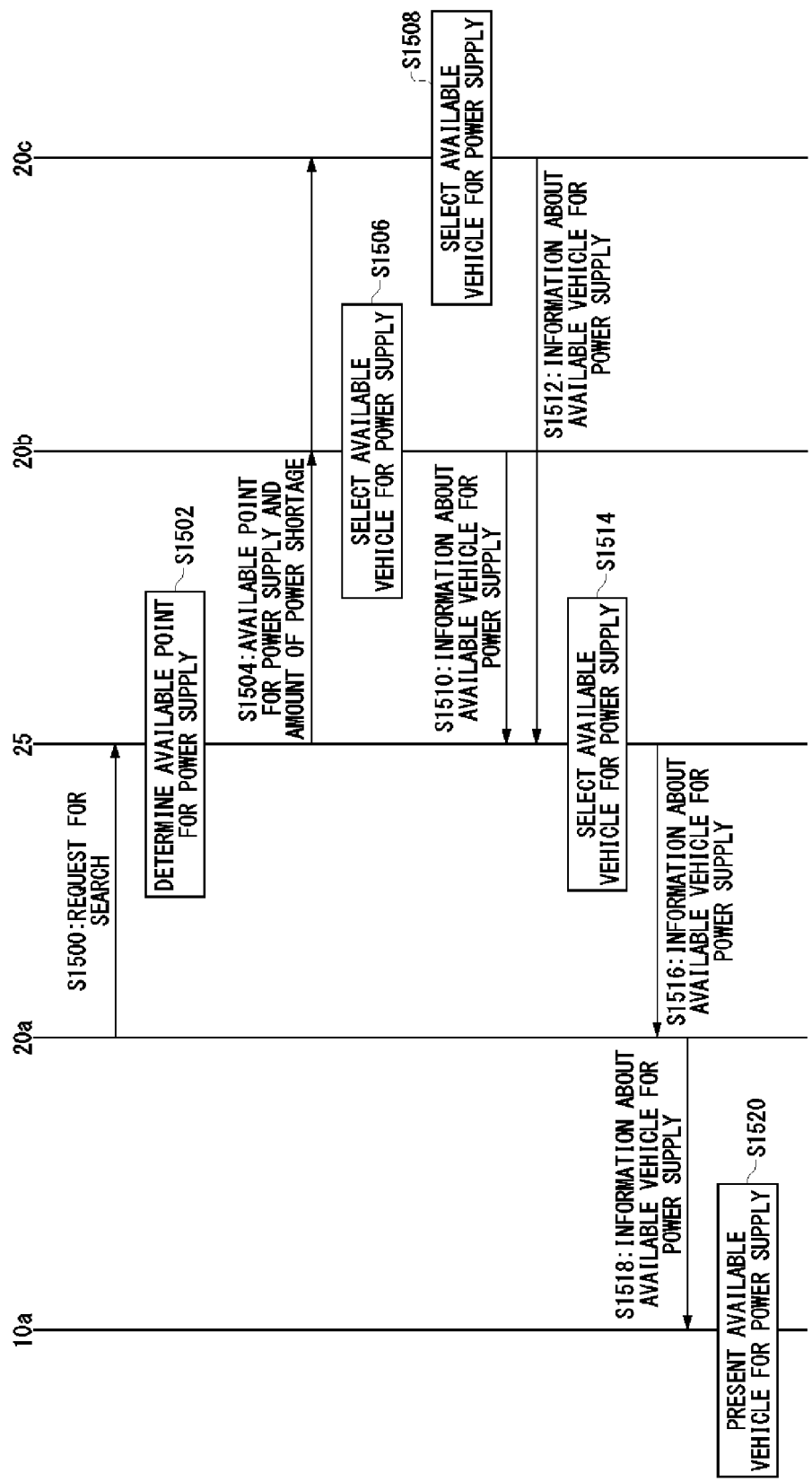
FIG. 15 shows a diagram showing one example of a sequence of communications between a linking server 25 and vehicle assistance servers 20.

FIG. 15 shows one example of a sequence of communications between the linking server 25 and the vehicle assistance servers 20. This sequence is based on the assumption that a target vehicle is the vehicle 10a.

If the vehicle assistance server 20a cannot select an available vehicle for power supply for the vehicle 10a, the vehicle assistance server 20a requests the linking server 25 to search for an available vehicle for power supply in step S1500. The vehicle assistance server 20a transmits information about the target vehicle including location information, the remaining capacity of a battery, a destination, information about a route, and the amount of power shortage in step S1500.

After receiving the search request, the linking server 25 determines an available point for power supply based on the information about the target vehicle including location information, the remaining capacity of a battery, a destination, and information about a route (step S1502). The available point for power supply shows a place where the target vehicle can be supplied with power from a different vehicle. The linking server 25 determines an available point for power supply that is within a range the vehicle 10a can reach with energy left in its battery. The linking server 25 forecasts the future locations of the target vehicle with reference to the information about the target vehicle such as information about a route and information about fuel efficiency, and selects the available point for power supply from the forecasted future locations. A plurality of points may be determined as available points for power supply. Further, an available point for power supply may be determined in consideration of information about expected time of arrival of the target vehicle.

The linking server 25 transmits information including the available point for power supply and the amount of power shortage to the vehicle assistance servers 20b and 20c in step S1504. The vehicle assistance servers 20b and 20c select available vehicles for power supply based on the information including the available point for power supply and the amount of power shortage (steps S1506 and S1508). As an example, the process described with reference to FIGS. 4 to 6 may be performed in steps S1506 and S1508. The vehicle assistance servers 20b and 20c transmit information about the available vehicles for power supply to the linking server 25 (steps S1510 and S1512) if they succeeded in selecting available vehicles for power supply.

After receiving the information about the available vehicles for power supply from the vehicle assistance servers 20b and 20c, the linking server 25 selects an available vehicle for power supply to be notified to the vehicle assistance server 20a from the available vehicles for power supply notified by the vehicle assistance servers 20b and 20c. As an example, the linking server 25 selects an available vehicle for power supply the user of which is registered as a user of service of the vehicle assistance system 1350 if a user of the target vehicle is not a user of this service. Meanwhile, the linking server 25 selects all the available vehicles for power supply if the user of the target vehicle is registered as a user of the service of the vehicle assistance system 1350. Then, in step S1516, the linking server 25 transmits information about the available vehicle for power supply selected in step S1514 to the vehicle assistance server 20a. The information about the available vehicle for power supply transmitted to the vehicle assistance server 20a may be restricted information such as the amount of available power to be supplied. The vehicle assistance server 20a transmits the information about the available vehicle for power supply received from the linking server 25 to the vehicle 10a. The vehicle 10a notifies a passenger of the vehicle 10a of the information about the available vehicle for power supply received from the vehicle assistance server 20a.

The vehicle assistance system 1350 described above requires either a user of a vehicle 10 as a target vehicle or a user of a vehicle 10 as an available vehicle for power supply to be a user of the service of the vehicle assistance system 1350, and to have the charging cable 290. However, the vehicle assistance system 1350 does not require both of these users to be users of the service. Further, the linking server 25 is only required to process data including location information and information about a destination, meaning that the linking server 25 is not required to manage personal information.

The description given above is based on the assumption that a vehicle assistance server 20 requests the linking server 25 to search for an available vehicle for power supply. Meanwhile, a vehicle 10 itself may request the linking server 25 to search for an available vehicle for power supply instead. The description given above is also based on the assumption that a vehicle assistance server 20 requests the linking server 25 to search for an available vehicle for power supply if the vehicle assistance server 20 could not find an available vehicle for power supply for a target vehicle. Meanwhile, the vehicle assistance server 20 may also request the linking server 25 to search for an available vehicle for power supply if the number of available vehicles for power supply does not exceed a predetermined number.

The technical scope of the invention is not limited to that of the embodiment of the invention described above. A person with ordinary skill in the art will clearly understand that various changes or modifications can be added to the aforementioned embodiment. The person with ordinary skill in the art will also clearly understand from appended claims that an embodiment with such changes or modifications is also within the technical scope of the invention.

It should be noted that operations, procedures, steps, stages and others of each process performed by a device, a system, a program, and a method shown in appended claims, specification, and drawings can be performed in any order as long as the order is not specifically indicated by "prior to," "before" and others, and as long as an output of a process is not used in a later process. Even if the procedure of the operations of appended claims, specification, and drawings is described by using a term such as "first," "next" and others, such a term does not mean that the operations should always be performed according to this procedure.

What is claimed is:

1. An information providing device comprising:
   an information acquiring part for acquiring, from each vehicle of a plurality of vehicles, a current location of the vehicle, an amount of power stored in a power storage unit of the vehicle that stores power for driving the vehicle, and a destination of the vehicle;
   a vehicle selecting part for selecting as an available vehicle for power supply from the plurality of vehicles based on the respective current locations and the amounts of stored power of the plurality of vehicles, the available vehicle to be selected being capable of supplying charging power to a target vehicle requiring charge of a power storage unit thereof;
   a notifying part for notifying of the available vehicle for power supply selected by the vehicle; and
   a power amount specifying part for specifying an amount of available power to be supplied to the target vehicle based on the respective destinations, the current locations, and the amounts of stored power of the plurality of vehicles, wherein
   the vehicle selecting part selects, as the available vehicle for power supply, a vehicle from the plurality of vehicles having available power to be supplied in an amount greater than an amount of power to be charged to the power storage unit of the target vehicle requiring charge.

2. The information providing device according to claim 1, wherein the vehicle selecting part selects the vehicle as the available vehicle for power supply from vehicles each having available power to be supplied in an amount greater than the amount of charging power based on the current location and the destination of the target vehicle, and the respective current locations and the destinations of the plurality of vehicles, the vehicle to be selected as the available vehicle for power supply being to pass through a point within a predetermined distance determined from a future location of the target vehicle.

3. The information providing device according to claim 2, further comprising a route specifying part for specifying respective future routes for the plurality of vehicles based on the respective current locations and the destinations of the plurality of vehicles, and wherein
   the vehicle selecting part selects the vehicle as the available vehicle for power supply from vehicles each having available power to be supplied in an amount greater than the amount of charging power based on the respective current locations of the plurality of vehicles and the routes specified by the route specifying part, the current location of the target vehicle, and a route for and a previously calculated vehicle speed for the target vehicle, the vehicle to be selected as the available vehicle for power supply being to pass through a point simultaneously with the target vehicle that is within a predetermined distance determined from the future location of the target vehicle.

4. The information providing device according to claim 3, wherein the notifying part notifies of a point the available vehicle for power supply and the target vehicle are to pass through simultaneously after making determination as to if the specified routes are along expressways or open roads.

5. The information providing device according to claim 3, further comprising a power consumption rate storage part for storing a reference value of a power consumption rate in association with a route, and wherein the power amount specifying part specifies the amount of available power to be supplied based on the reference value of the power consumption rate stored in the power consumption rate storage part and the routes specified by the route specifying part.

6. The information providing device according to claim 3, wherein the power amount specifying part specifies respective power consumption efficiencies of the plurality of vehicles based on a history of the current locations and remaining capacities acquired by the information acquiring part, and specifies an amount of available power to be supplied based on the specified power consumption efficiencies and the routes specified by the route specifying part.

7. The information providing device according claim 1, wherein:

the information acquiring part acquires selection information indicating the vehicle selected by the target vehicle as a vehicle to supply charging power to the target vehicle from the available vehicles for power supply notified by the notifying part; and the notifying part transmits a selection notification to the vehicle indicated by the selection information, the selection notification notifying the vehicle of a fact that the vehicle has been selected by the target vehicle.

8. The information providing device according to claim 7, wherein:

the notifying part transmits the selection notification to the vehicle indicated by the selection information, the selection notification indicating a request for supply of charging power;

the information acquiring part receives consent information indicating consent of supply of charging power from the vehicle having received the selection notification from the notifying part;

the information providing device further comprises an information storage part for storing information about charge between vehicles that stores information for identifying a vehicle to supply power having transmitted the consent information, and information for identifying the target vehicle in association with each other.

9. The information providing device according to claim 8, wherein the notifying part notifies the vehicle identified by one of identification information of at least one of a vehicle type, a body color, and a license plate number of the vehicle identified by the other one of identification information, the identification information being stored in association with each other in the information storage part for storing information about charge between vehicles.

10. The information providing device according to claim 8, further comprising an authenticating part for communicating with a charging cable connected to a first vehicle and a second vehicle, and transmitting information indicating whether charge between the first and second vehicles is allowed or not to the charging cable, and wherein the authenticating part transmits information indicating permission for charge between the first vehicle and the second vehicle to the charging cable when the information storage part for storing information about charge between vehicles stores information for identifying the first vehicle and information for identifying the second vehicle in association with each other.

11. An information providing server communicating with a plurality of the information providing devices according to claim 1, the information providing devices each selecting the available vehicle for power supply from a predetermined group of vehicles, the server comprising:

a target vehicle information acquiring part for acquiring a current location and an amount of stored power about the target vehicle from one of the plurality of information providing devices;

a vehicle selection control part for making another one of the plurality of information providing devices select an available vehicle for power supply capable of supplying charging power to a power storage unit of the target vehicle based on the current location and the amount of stored power of the target vehicle;

an available vehicle information acquiring part for acquiring information from the another information providing device, the acquired information specifying the available vehicle for power supply selected by the another information providing device; and an available vehicle information notifying part for notifying the another information providing device of the available vehicle for power supply acquired by the available vehicle information acquiring part.

12. The information providing server according to claim 11, wherein:

the information acquiring parts of the plurality of information providing devices further acquire the respective destinations of the plurality of vehicles;

the target vehicle information acquiring part further acquires the destination of the target vehicle from the one information providing device, and the vehicle selection control part makes the another information providing device select the available vehicle for power supply based on the current location, the amount of stored power, and the destination of the target vehicle.

13. The information providing server according to claim 12, wherein the vehicle selection control part includes a point specifying part for specifying a point the target vehicle can reach based on the current location, the amount of stored power, and the destination of the target vehicle, and a selection control part for notifying the another information providing device of the point specified by the point specifying part, and making the another information providing device select the available vehicle for power supply capable of supplying charging power to the target vehicle at the specified point.

14. A vehicle assistance system comprising:

a plurality of the information providing devices according to claim 1, the information providing devices each selecting the available vehicle for power supply from a predetermined group of vehicles; and an information providing server communicating with the plurality of information providing devices, wherein the plurality of information providing devices each transmit the current location and the amount of stored power of the target vehicle if the vehicle selecting part of each of the information providing devices cannot select one or more vehicles as the available vehicles for power supply from the corresponding group of vehicles, the one or more vehicles to be selected being capable of supplying charging power to the target vehicle, and the information providing server includes:

a target vehicle information acquiring part for acquiring the current location and the amount of stored power of the target vehicle from one of the plurality of information providing devices;

a vehicle selection control part for making another one of the plurality of information providing devices select an available vehicle for power supply capable of supplying charging power to a power storage unit of the target vehicle based on the current location and the amount of stored power of the target vehicle;

an available vehicle information acquiring part for acquiring information from the another information providing device, the acquired information specifying the available vehicle for power supply selected by the another information providing device; and an available vehicle information notifying part for notifying the another information providing device of the available vehicle for power supply acquired by the available vehicle information acquiring part.

15. A navigation device for use in a vehicle, comprising:

an information acquiring part for acquiring a current location and a destination of the vehicle;

a power amount specifying part for calculating an amount of power capable of being supplied to a different vehicle based on the current location and the destination of the vehicle and an amount of power stored in a power storage unit of the vehicle that stores power for driving the vehicle;

a communication part for transmitting the current location and the amount of power calculated by the power amount specifying part to an external information providing device;

a different-vehicle information acquiring part for acquiring, from the information providing device, information about the difference vehicle that is to be charged with power of the power storage unit, the different vehicle requiring an amount of power to be charged to a power storage unit of the different vehicle smaller than the calculated amount of power capable of being supplied to the different vehicle; and a presenting part for presenting the information about the different vehicle, wherein the vehicle and the different vehicle are configured to transfer power from one to the other.

16. The navigation device according to claim 15, wherein the different-vehicle information acquiring part acquires at least one piece of information of a vehicle type, a body color, and a license plate number of the different vehicle from the information providing device, and the presenting part presents the information acquired by the different-vehicle information acquiring part.

* * * * *